United States Patent
Nakagawa et al.

(10) Patent No.: US 6,912,089 B2
(45) Date of Patent: Jun. 28, 2005

(54) OPTICAL DIFFUSION FILM AND PROCESS OF PRODUCING OPTICAL DIFFUSION FILM

(75) Inventors: Kenichi Nakagawa, Shizuoka (JP);
Keisuke Ozeki, Shizuoka (JP);
Shintaro Washizu, Shizuoka (JP)

(73) Assignee: Fuji Photo Film Co., Ltd., Kanagawa (JP)

( * ) Notice: Subject to any disclaimer, the term of this patent is extended or adjusted under 35 U.S.C. 154(b) by 54 days.

(21) Appl. No.: 10/003,310

(22) Filed: Dec. 6, 2001

(65) Prior Publication Data

US 2002/0126377 A1 Sep. 12, 2002

(30) Foreign Application Priority Data

Dec. 6, 2000 (JP) .......................... 2000-371976
Mar. 13, 2001 (JP) .......................... 2001-070801

(51) Int. Cl.[7] .......................... G02B 13/20; G03B 21/60
(52) U.S. Cl. .......................... 359/599; 359/453; 359/614
(58) Field of Search .......................... 359/443–461, 359/515–530, 599–614; 362/31; 428/142–143, 323–382, 913

(56) References Cited

U.S. PATENT DOCUMENTS

| | | | |
|---|---|---|---|
| 2,378,252 A | * 6/1945 | Staehle et al. | 359/453 |
| 3,491,237 A | * 1/1970 | Tillett | 250/458.1 |
| 3,614,199 A | * 10/1971 | Altman | 359/540 |
| 5,563,738 A | * 10/1996 | Vance | 359/614 |
| 6,022,664 A | 2/2000 | Washizu et al. | 430/138 |
| 6,172,814 B1 | * 1/2001 | Watanabe et al. | 359/619 |
| 6,204,971 B1 | * 3/2001 | Morris et al. | 359/619 |
| 6,262,840 B1 | * 7/2001 | Watanabe et al. | 359/453 |
| 6,344,263 B1 | * 2/2002 | Moshrefzadeh et al. | 428/206 |
| 6,567,215 B2 | * 5/2003 | Ballen et al. | 359/453 |
| 6,692,647 B2 | * 2/2004 | Moshrefzadeh et al. | 216/24 |

FOREIGN PATENT DOCUMENTS

| | | | | |
|---|---|---|---|---|
| EP | 0 399 841 A2 | | 11/1990 | |
| EP | 1 098 209 A1 | | 5/2001 | |
| JP | 58-171733 | * | 10/1983 | ................. 359/614 |
| JP | A 4-211252 | | 8/1992 | |
| JP | A 5-333202 | | 12/1993 | |
| JP | A 9-318801 | | 12/1997 | |
| JP | A 11-102025 | | 4/1999 | |
| JP | A 2000-275411 | | 10/2000 | |

OTHER PUBLICATIONS

English Abstract of Japanese reference No. 4–211252.
English Abstract of Japanese reference No. 11–102025.

* cited by examiner

*Primary Examiner*—Thong Q. Nguyen
(74) *Attorney, Agent, or Firm*—Young & Thompson

(57) ABSTRACT

A process of producing an optical diffusion film which comprises at least a transparent base layer on a transparent substrate, a layer of transparent microspheres over the transparent base layer and a light absorbing layer over said transparent base layer comprises the steps of: distributing transparent microspheres in a layer over the transparent base layer so that each the transparent microsphere is partly embedded in the transparent base layer; and by coating a solution layer of coloring material that is convertible into fine metal particles and treating the solution layer of coloring material under specified conditions so as thereby to convert the solution layer of coloring material into a layer of fine metal particles that are light absorbable.

22 Claims, 7 Drawing Sheets

FIG. 4
PRIOR ART
STEP I
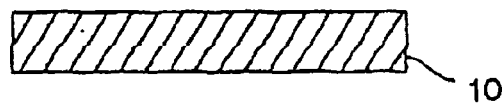
STEP II
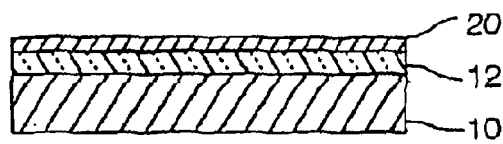
STEP III
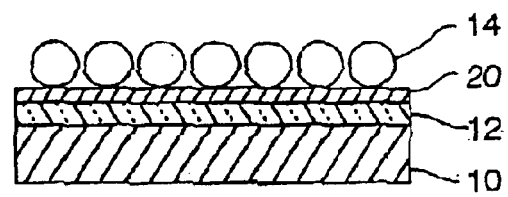
STEP IV
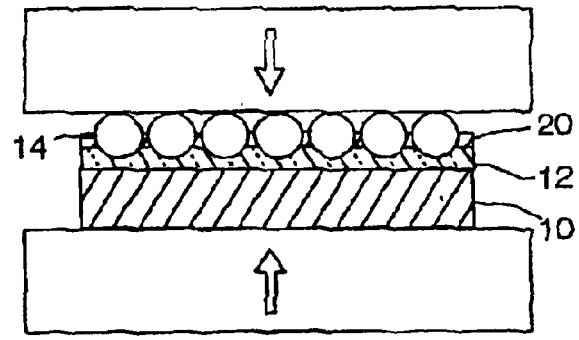
STEP V
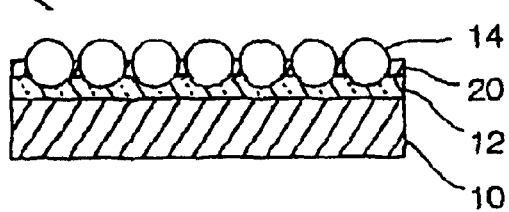

OPTICAL DIFFUSION FILM AND PROCESS OF PRODUCING OPTICAL DIFFUSION FILM

BACKGROUND OF THE INVENTION

1. Field of the Invention

The present invention relates to an optical diffusion film for use with liquid crystal displays, translucent rear projection screens and a process of producing the optical diffusion film.

2. Description of Related Art

There have been known various liquid crystal displays significantly improved in viewing angle characteristics on gradation and chromaticity such as disclosed in U.S. Pat. No. 2,378,252.

For the purpose of providing a brief background that will enhance an understanding of the present invention, reference is made to FIGS. 1 to 5.

Referring to FIGS. 1 and 2, the liquid crystal display 100 includes a liquid crystal panel 2, a backlight source 4 which illuminates the liquid crystal panel 2 with collimated light rays and an optical diffusion film 6 operative to diffuse light rays of an projected image spatially modulated by the liquid crystal panel 2. As schematically shown in FIG. 2, the optical diffusion film 6 comprises transparent microspheres or beads 14 uniformly distributed on a transparent substrate 10 and fixedly held between the transparent substrate 10 and a light absorbing layer 20. The transparent microspheres 14 are in close contact with and partly embedded in the transparent substrate 10.

Collimated light rays incoming the optical diffusion film 6 are refracted by the transparent microspheres 14 and come out of the optical diffusion film 6 passing through an interface between the transparent microspheres 14 and the transparent substrate 10. The light absorbing layer 20, except portions in contact with the transparent substrate 10, works as a black mask, so that the optical diffusion film 6 do not cause reflection and scatter of ambient light rays incident thereon from an viewing side. In this way the light rays incoming the optical diffusion film 6 are diffused. As a result, the optical diffusion film 6 cause the liquid crystal display 100 to display an image provide without a reduction in contrast. In addition the optical diffusion film 6 provides a satisfactory contrast over a wide range of viewing angle.

There have been widely utilized optical diffusion films that improve contrast of a projected image of the liquid crystal display 100. One of such the optical diffusion films that is practically used is shown in FIG. 3.

Referring to FIG. 3, an optical diffusion film 6 comprises a transparent base layer 12 formed over a transparent substrate 10, transparent microspheres 14 uniformly distributed and partly embedded in the transparent base layer 12 and a light absorbing layer 20 formed over the light absorbing layer 20 so as to have a pattern complementary to the distribution pattern of transparent microspheres 14. The optical diffusion film 6 is provided with the transparent base layer 12 in order to assure light transmissible areas 14a of the transparent microsphere 14 that are defined or masked by the light absorbing layer 20. In addition, the light absorbing layer 20 is formed on the transparent base layer 12 so as to absorb incoming light rays that are not part of a projected image and ambient light rays incident upon the light absorbing layer 20 from the viewing side. In consequence, the optical diffusion film 6 provides high light transmission efficiency and provide a projected image on the liquid crystal display 100 with satisfactory contrast over a wide range of viewing angle due to no reflection and scatter of light rays.

FIG. 4 schematically shows a process of producing the optical diffusion film 6 that is disclosed in, for example, Japanese Unexamined Patent Publication No. 9-318801. As shown in FIG. 3, the process comprises the steps of: preparing a transparent substrate 10 (step I); forming a transparent base layer 12 on the transparent substrate 10 and a light absorbing layer 20 over the transparent binder layer 12 (step II); closely and uniformly distributing a number of transparent microspheres 14 on the light absorbing layer 20 (step III); heating and pressing the layer of transparent microspheres 14 against the transparent binder layer 12 until the transparent microsphere 14 are partly embedded in the transparent binder layer 12 (step IV); and completing an optical diffusion film 6 by fixing the transparent microspheres 14 to the transparent binder layer 12 (step V).

The optical diffusion film 6 thus produced has the structure that the transparent microspheres 14 are masked or partly surrounded by the light absorbing layer 20 and embedded in the transparent binder layer 12. Due to this structure, the optical diffusion film 6 efficiently directs incoming light rays of a projected image to the transparent microspheres 14 closely distributed. Each of the transparent microsphere 14, that functions as a lens, converges the incoming light rays of the projected image and then diverges them, as a result of which the liquid crystal display 100 equipped with the optical diffusion film 6 is improved in the viewing angle characteristics. The incoming light rays into the optical diffusion film 6 that travels missing the transparent microspheres 14 are absorbed by the light absorbing layer 20 and, in consequence, do not come out of the optical diffusion film 6. Further, ambient light rays incident upon the optical diffusion film 6 from the viewing side are almost completely absorbed by the light absorbing layer 20, so as not to be observed as stray light. This causes the liquid crystal display 100 equipped with the optical diffusion film 6 to display an image with improved contrast.

However, as shown in FIG. 5, if the transparent microspheres are different in size, in other words, if there are transparent microspheres 142 and 143 smaller or larger in size than an average transparent microspheres 14, respectively, these transparent microspheres 14, 142 and 143 are not always distributed so as to be in uniform contact with the transparent substrate 10. That is, the smaller transparent microspheres 142 are possibly buried in the light absorbing layer 20 and isolated from the transparent substrate 10. As a result, the presence of smaller transparent microspheres 142 causes a reduction in transmittance of the optical diffusion film 6. On the other hand, the larger transparent microspheres 143 are possibly damaged when they are heated and pressed against the transparent binder layer 12. This leads to an occurrence of image defects due to absence of light.

As disclosed in, for example, Japanese Unexamined Patent Publication No. 11-102025, one of technical solutions to these problems of the optical diffusion film is to increase the transmittance of the optical diffusion film 6 by employing a transparent base layer having a melting viscosity n higher than a melting viscosity of light absorbing layer n'. According to the technical solution, because the light absorbing layer causes thermal deformations earlier than the transparent base layer during embedding the transparent microspheres in the transparent base layer, the transparent microspheres are easily embedded in the transparent base layer. This leads to an increase in transmittance of the optical diffusion film.

In the event where the pressure applied to the transparent microspheres is low and uniform during heating and pressing, there are some transparent microspheres that become isolated from the transparent base layer. This leads to an insufficient area of the transparent microsphere that is effective to transmit light rays and, as a result of which, the optical diffusion film is difficult to gain a sufficient increase in transmittance. This problem is significant when there are transparent microspheres having a wide range of sizes. On the other hand, in the event where the pressure applied to the transparent microspheres is too high, there occurs such damages of microspheres as to cause surface defects which result in absence of light.

Further, in recent years, there has been a strong demand of high performance of the optical diffusion film with the advance of high performance liquid crystal displays and projection screens. In particular, it is strongly called for that liquid crystal displays can display an image with high quality, i.e. high contrast and low coarseness. It is conceivably useful to employ microspheres small in particle size in order for the liquid crystal display to display an image free from coarseness. However, because it is essential to make the light absorbing layer thinner with a decrease in particle size of microspheres, the thickness of the light absorbing layer is possibly below a thickness necessary to provide a projected image with high contrast. In addition, a thickness of the transparent base layer is one of important factors decreasing contrast of a projected image. It is speculated that this decrease in contrast of a projected image is due to a ratio of an effective light transmissible surface area of a microsphere to a black-masked surface area of the microsphere and total internal reflection of ambient light rays by the microspheres. Accordingly it is conceivably effective to make the transparent base layer as thin as possible in order fort the liquid crystal display to provide a projected image with high contrast. In the event where the transparent base layer is too thin, the transparent base layer lowers its holding power for the microspheres and possibly allows the microspheres to come off therefrom during the step of forming the light absorbing layer. Further even though the transparent base layer has the lowest thickness necessary to securely hold the microspheres, it is hard for the liquid crystal display to prevent a decrease in contrast of a projected image.

In light of the drawback, it has been strong demand that the optical diffusion film comprises a transparent base layer having a sufficient thickness that does not lead a cause of a decrease in contrast of a projected image while it prevents coming off of microspheres.

SUMMARY OF THE INVENTION

It is an object of the present invention to provide an optical diffusion film having high transmittance and superior viewing angle characteristics but less unevenness of brightness distribution.

It is an object of the present invention to provide an optical diffusion film for a display device which can project an image with high contrast and without coarseness.

It is a further object of the present invention to provide a process of producing an optical diffusion film with high efficiency.

According to one aspect of the present invention, an optical diffusion film for rear projection type display devices comprises a transparent base layer, a layer of transparent microspheres distributed in a random pattern on over the transparent base layer so that each transparent microsphere is partly embedded in the transparent base layer, and a light absorbing layer formed in a pattern complementary to the random pattern of the layer of transparent microspheres over the transparent base layer at one of opposite sides so as to leave each transparent microsphere partly bare, the light absorbing layer being made of a coloring material convertible to fine metal particles under specified conditions.

The optical diffusion film may further comprises a transparent substrate on which the transparent base layer is formed.

The light absorbing layer is desirably made of a coloring material for containing a coloring material such as silver behenite. Further, the transparent base layer is desirably made of coloring material containing a reducing material such as a gallic acid.

Transparent microspheres are desirably in a range of size between approximately 3 $\mu$m and approximately 50 $\mu$m in volumetric mean size, and more desirably between approximately 3 $\mu$m and approximately 15 $\mu$m in volumetric mean size when the optical diffusion film is for use with a display device having a distance of distinctive vision of approximately 300 mm or between approximately 10 $\mu$m and approximately 50 $\mu$m in volumetric mean size when the optical diffusion film is for use with a display device having a distance of distinctive vision of approximately 2 m.

The optical diffusion film is produced by a process comprising the steps of forming a transparent base layer on a transparent substrate; distributing transparent microspheres in a layer over the transparent base layer so that each transparent microsphere is partly embedded in the transparent base layer; forming a light absorbing layer over the transparent base layer leaving each transparent microsphere partly bare by coating a solution layer of coloring material that is convertible into fine metal particles under specified conditions and treating the solution layer of material under the specified conditions so as thereby to convert the solution layer of coloring material into a layer of fine metal particles as the light absorbing layer.

The layer of transparent microspheres on the transparent base layer may be heated so as to partly embed each the transparent microsphere in the transparent base layer, desirably through a heat conductive flexible sheet, such as comprises silicone rubber, put over the layer of transparent microspheres.

According to another aspect of the present invention, the optical diffusion film comprises a transparent base layer, a layer of transparent microspheres distributed in a random pattern formed over the transparent base layer so that each the transparent microsphere is partly embedded in the transparent base layer, a first light absorbing layer formed in a pattern complementary to the random pattern of the layer of transparent microspheres over one of opposite surfaces of the transparent base layer so as to leave each the transparent microsphere partly bare, and a second light absorbing layer formed over another surface of the transparent base layer, the second light absorbing layer having transparent areas arranged in a pattern mating the random pattern of the transparent microspheres.

The transparent microspheres are in a range of size in volumetric mean size between approximately 0.5 $\mu$m and approximately 50 $\mu$m.

The optical diffusion film may further comprises a transparent binder layer formed over the first light absorbing layer and the layer of transparent microspheres.

The optical diffusion film may further comprise a transparent substrate on which the second light absorbing layer, the transparent base layer and the first light absorbing layer are formed.

The optical diffusion film is produced by a process comprising the steps of forming a transparent base layer on a transparent substrate, distributing transparent microspheres in a random pattern over the transparent base layer so that each the transparent microsphere is partly embedded in the transparent base layer, forming a first light absorbing layer over one of opposite surfaces of the transparent base layer leaving each the transparent microsphere partly bare; and forming a second light absorbing layer over another surface of the transparent base layer by forming a layer of photosensitive coloring material, exposing the layer of photosensitive coloring material to light through the layer of transparent microspheres from a side of the first light absorbing layer and developing the layer of photosensitive coloring material to color the layer of photosensitive coloring material in a pattern complementary to the random pattern of the transparent microspheres.

The optical diffusion film producing process may further comprise the steps of; forming a transparent binder layer over the optical diffusion film at a side opposite to the transparent base layer; and peeling the transparent substrate apart from the transparent base layer; before forming the second light absorbing layer.

The first light absorbing layer is preferably formed by forming a layer of photo-curable material or a layer of photo-curable photo-sensitive material, exposing the layer and developing the exposed layer.

BRIEF DESCRIPTION OF THE DRAWINGS

The above and other objects and features of the present invention will be clearly understood from the following detailed description when read with reference to the accompanying drawings, in which:

FIG. 4 is an illustration showing the general idea of a process of producing the optical diffusion film;

DETAILED DESCRIPTION OF PREFERRED EMBODIMENTS

In the following description the term "transparent" as used herein shall be referred to "visible light transmissible," and the terms "microsphere" or "bead" as used herein shall been directed to rounded unitary elements but may not be perfect spheres.

Figure 1:
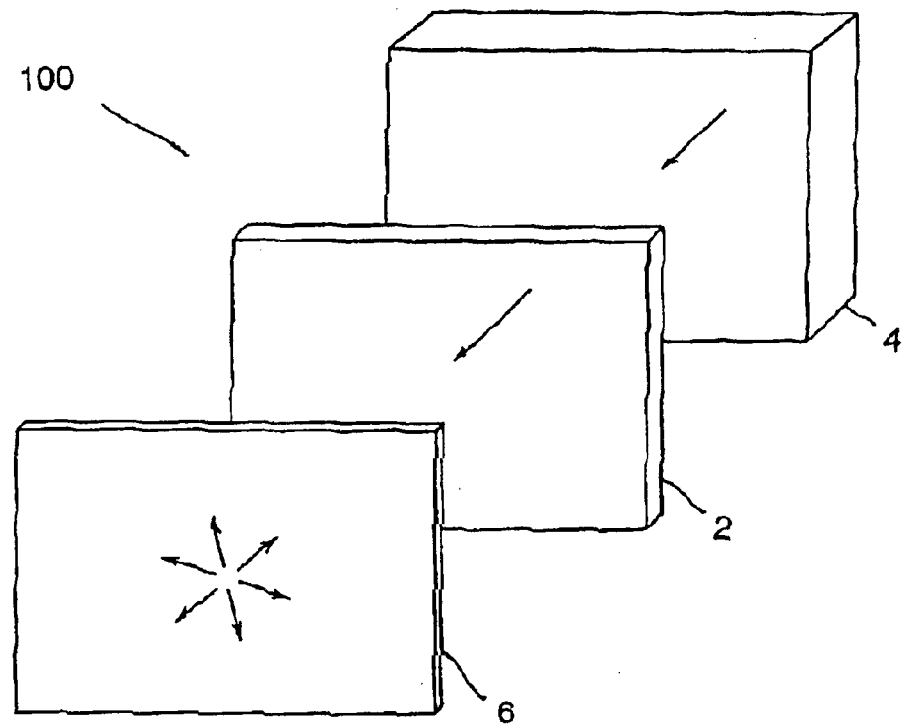
FIG. 1 is an exploded perspective view of a liquid crystal display.
Figure 2:
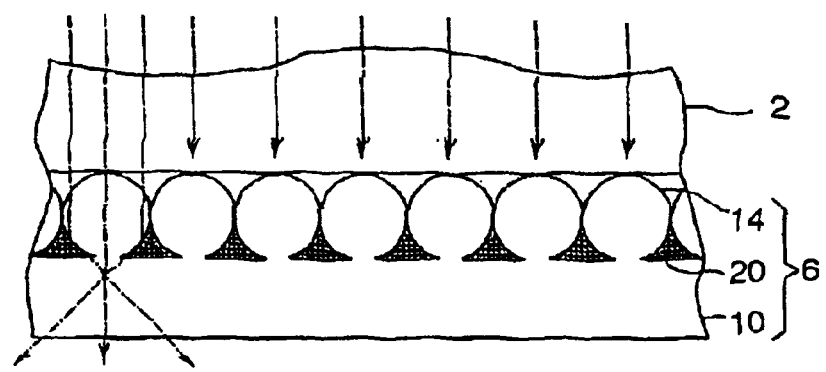
FIG. 2 is a cross-sectional view of an optical diffusion film roughly showing the general idea of diffusion of light rays incident upon the optical diffusion film.
Figure 3:
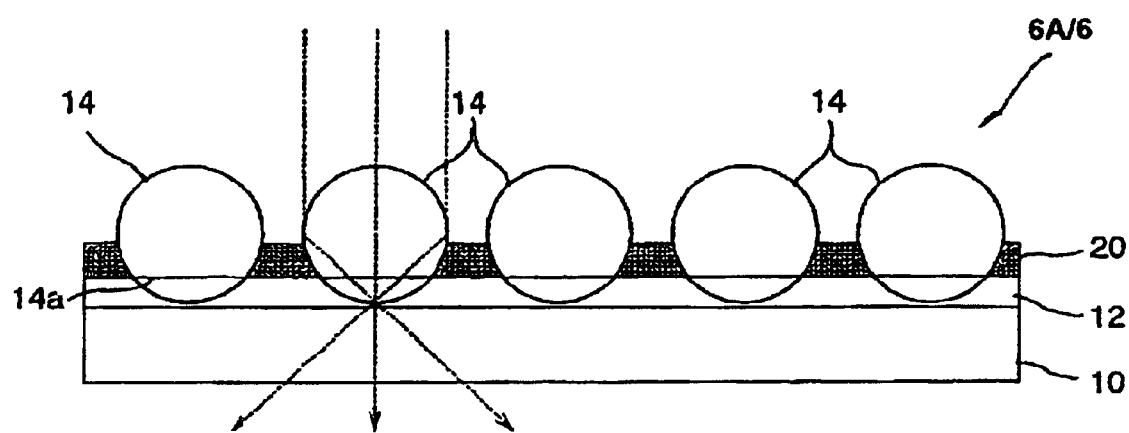
FIG. 3 is a cross-sectional view of a prior art optical diffusion film.

An optical diffusion film according to an embodiment of the present invention is the same in mechanical structure as that shown in FIG. 3 and, however comprises a light absorbing layer that is made of a coloring material convertible to fine metal particles under specified conditions.

The optical diffusion film is produced by an optical diffusion film producing process of the present invention that comprises at least the steps of forming an under coating layer of a solution of transparent base material as the transparent base layer 12 over the transparent substrate 10, distributing as uniformly as possible and partly embedding transparent microspheres 14 in the transparent base layer 12, and forming an over coating layer of a solution of light absorbable material as a light absorbing layer 20 on the transparent base layer 12. The process may include additional steps, if necessary.

The transparent substrate 10 has no limitations on its material as long as it has a desired transmittance and a sufficient mechanical strength according to use. The available materials include various kinds of transparent glass plates and various kinds of resin sheets or plates that are made of polyesters, polyolefins, polyamides, polyethers, polyethylene-terephthalate (PET), polyethylenenaphthalate (PEN), polystyrene, polyester-amides, polycarbonates polyphenylene sulfides, polyether esters, polyvinyl chloride, polymethacrylate ester or the like. The transparent substrate 10 has no limitation on its thickness but preferably has a thickness between 50 $\mu$m and 500 $\mu$m.

It is desirable to apply an antireflection coating over the front surface of the optical diffusion film 6A for the purpose of improving visibility of a liquid crystal display.

The transparent base layer 12 is formed by coating a solution of material over the transparent substrate 10. There is no limitation on the material for the base layer as long as the transparent base layer 12 allows the transparent microspheres 14 to be partly embedded therein. The solution of material preferably contains a reducing material and, if necessary, various resins. In the case where the solution of material contains a reducing material and the solution of light absorbable material contains a coloring material, the coloring material is reduced by the reducing material to produce fine metal particles, in other words, to develop a color in the light absorbing layer 20. This is realized by selecting proper conditions of forming these under and over layers as will be described later.

The transparent base layer 12 has no limitation on its thickness and is, however, preferably such as to bury the transparent microspheres 14 only partly therein and to hold the transparent microspheres 14 with uniform force. Though the thickness of the transparent base layer 12 depends upon sizes of employed transparent microspheres, it preferably be approximately one tenth (1/10) as thin as the volumetric mean size ($D_{50}$) of the transparent microspheres 14.

As was previously described, the solution of material for the transparent base layer 12 preferably contains a reducing material. There is no limitation on the reducing material as long as it is able to reliably produce the fine metal particles. As is disclosed in, for example, in Japanese Unexamined Patent Publication No. 53-102025, the reducing material may be one selected from a group of mono-, bi-, tri- and tetra- xyphenol, mono- and bi-naphthol, di- and poly-hydroxynaphtalene, di- and poly-hydroxybenzene, hydroxy-monoether, ascorbic acid, 3-pyrazoridon, pyrazorin, pyrazolone, reducing saccharides, phenylenediamine, hydroxylamine, reduktone, hydrooxamine, hydrazides, amideoximes, N-hydroxyureas and the like. In particular, it is preferred to employ an aromatic organic reducing material such as phenol, polyphenol, sulfonamidephenol, and naphthol. When focusing on a coloring reaction speed and developed color density, it is preferred to employ gallic acid or its ester. These materials can be used singly or in the combinations of two or more.

The solution of coloring base material preferably contains approximately 5 wt-% to 50 wt-% and, more desirably, approximately 20 wt-% to approximately 40 wt-%, of the reducing material. The reducing material less than 5 wt-% has a tendency to produce an insufficient amount of fine metal particles. On the other hand, the reducing material greater than 50 wt-% has a tendency to make the light absorbing layer 20 too thick. This result in burying the transparent microspheres 14 in the light absorbing layer 20 with an adverse effect of reducing an effective area that transmits light lays.

The thickness of the light absorbing layer 20 can microspherejusted by controlling the reducing material content of the solution so as to have a sufficient area available for transmission of light rays and a sufficient thickness.

There are various materials available as the resin that is preferably contained in the transparent base layer 12. The available materials include vinyl acetate resins, ethylene-vinyl acetate copolymers, vinyl chloride resins, vinyl chloride-vinylidene chloride copolymers, meta-acrylic acid ester resins, butyral resins, silicone resins, polyester, polyamide, vinylidene fluoride resins, cellulose nitrate resins, polystyrene, styrene-acrylic copolymers, urethane resins, polyethylene, polypropylene, polypropylene chloride resins, rosin derivatives and the like. From the standpoint of adhesive property necessary for the transparent base layer 12 to form a single layer of aspheric transparent microspheres 14 hereon and thermo plasticity necessary for the aspheric transparent microspheres 14 to be partly embedded in the transparent base layer 12, it is preferred to employ polyamide and, more desirably, water soluble nylon. These materials can be used singly or in the combinations of two or more.

The solution of material for the base layer may further contain a solvent such as water, alcohol and cresol and/or surface active material effective in equalizing the coated base layer.

There is no limitation on material for the transparent microspheres 14 as long as they are transparent. There are various materials employable as the transparent microspheres 14. The same materials as those of the transparent substrate 10 can be employed. In particular, from the standpoint of satisfactory optical characteristics, it is preferred to employ acrylic resins and transparent glasses.

The transparent microsphere 14, which are desirably in the shape of rounded unitary elements and may not be perfect spheres, has no specific limitation on its size as long as providing viewers with no feeling of coarseness of an image projected on a screen or a display. The transparent microspheres 14 are different in size and, however in a specified range of volumetric mean size ($D_{50}$). The volumetric mean size ($D_{50}$) of the transparent microspheres 14 is different according to uses and applications of the optical diffusion film 6A. Specifically, in the case where the optical diffusion film 6A is installed to a desktop image display device which has a standard viewing distance of approximately 30 cm, the volumetric mean size ($D_{50}$) is preferred to be less than 50 μm, desirably, less than 30 μm and, more desirably, between 3 μm and 15 μm. In the case where the optical diffusion film 6A is installed to a home television which has a viewing distance of approximately 200 cm, the volumetric mean size ($D_{50}$) is preferred to be less than 300 μm, desirably, less than 200 μm and, more desirably, between 10 μm and 50 μm.

The transparent microsphere 14 is partly embedded not in the light absorbing layer 20 but in the transparent base layer 12 that is between the light absorbing layer 20 and the transparent substrate 10. This means that the transparent microsphere 14 partly passes through the light absorbing layer 20. Accordingly, it is easy for the transparent microspheres 14 to be embedded in the transparent base layer 12 sufficiently deep to cause light rays to pass through, so as to provide the optical diffusion film 6A with sufficient transmittance and superior viewing angle characteristics even if the transparent microspheres 14 are uneven in embeded depth in the transparent base layer 12.

In the step of embedding the transparent microspheres 14 in the transparent base layer 12, the transparent microspheres 14 are preferred to be embedded uniformly deep in the transparent base layer 12 for providing the optical diffusion film 6A with high uniformity of brightness distribution and high transmission efficiency. In the standpoint of providing the optical diffusion film 6A with high transmission efficiency, it is desirable to distribute and lay the transparent microspheres 14 as uniformly and closely to one another as possible on the transparent base layer 12. The utilization of different sizes of microspheres is desirable for close distribution of the transparent microspheres. Further, in the standpoint of providing the optical diffusion film 6A with high transmission efficiency, it is desirable to embed each of the transparent microspheres 14 less than half in volume in the transparent base layer 12.

During embedding the transparent microspheres 14, the transparent base layer 12 may be heated to a temperature desirably between 100° C. and 150° C. so as to soften up sufficiently in order to embed the transparent microspheres 14 therein. Heating the transparent base layer 12 is desirably carried out while pressing the transparent microspheres 14 through a heat conductive flexible sheet put over the transparent microspheres 14. There is no limitation on the pressure against the transparent microspheres 14 as long as it does not damage the transparent microspheres 14. This provides the embedded transparent microspheres 14 with improved uniformity. There is no limitation on the heat conductive flexible sheet. The heat conductive flexible sheet may be desirably made of silicone rubber that is advantageous from the standpoint of heat conductivity, flexibility and easy acquisition.

The light absorbing layer 20 is formed by coating a solution of light absorbable material over the transparent base layer 12. The solution of light absorbable material is transparent with respect to visible light and is converted to fine metal particles under specific conditions. The fine metal particles develop a color so as to absorb light rays. The light absorbing layer 20 can be controlled in thickness by means of quantitative regulation of the metal particles. The light absorbing layer 20 is desirably such as to have the transparent microspheres 14 partly naked as much as the transparent microspheres 14 allow sufficient light rays to enter the optical diffusion film 6A.

There is no limitation on the solution of light absorbable material as long as it produces fine metal particles that form a light absorbing layer. Preferably, the solution of light absorbable material contains a coloring material. When the solution of material for the base layer contains a reducing material and the solution of light absorbable material contains a coloring material, the coloring material is reduced by the reducing material under specific conditions to produce fine metal particles, in other words, to develop a color, so as to satisfactorily form the light absorbing layer 20. The conditions for reduction of the coloring material include heating the solution at a temperature between 90° C. and 150° C. for a period of time between five and 60 seconds. However, this condition is not always necessary and may be changed according to, for instance, the quantity of reducing material.

There is no limitations on the coloring material as long as the coloring material is convertible into fine metal particles. There are various materials employable as the coloring material. Desirable materials are organometacil salts, namely silver salts of long chain aliphatic carboxylic acid such as silver lauriate, myristic acetate, silver palminate, silver stearate, silver arachinate and silver behenate, silver salts of organic compounds having an imino group such as silver benzotriazole, silver benzimidazole, silver carbazole and silver phthalazinone, silver salts of sulfur containing compounds such as s-alkylthioglycolate, silver salts of aromatic carboxylic acid such as silver benzoate and silver phthalate, silver salts of sulfonate such as silver ethansulfonate, silver salts of sulfonic acid such as o-silver toluenesulfinate, silver salts of phosphoric acid such as silver phenylphosphate, silver salts of salicylic aldoxyme, silver barbitule, silver saccharate and the like. It is preferred to employ silver salts of long chain aliphatic carboxylic acid, in particular silver behenite. These materials can be used individually or in the form of mixtures thereof.

The solution of light absorbable material may further contain a surface active material effective in equalizing the coated transparent base layer in addition to a solvent such as water, alcohol and cresol.

The light absorbing layer 20 has no limitation on its thickness and is, however, desirable to have approximately the same thickness as the volumetric mean size ($D_{50}$) of the transparent microspheres 14. From the fact that the light absorbing layer 20 is formed by conversion to colored fine metal particles, it is not necessary to coat the solution of light absorbable material so as to have the transparent microspheres 14 partly exposed with an intention to cause ensure the optical diffusion film 6A to receive an ensured quantity of It is necessary to adjust the thickness of the light absorbing layer 20 in consideration of an ensured quantity of light entering the transparent microspheres 14. Although it is not always necessary, the thickness of the light absorbing layer 20 is preferably, for example, between 0.5 $\mu$m and 5 $\mu$m when the transparent microspheres 14 have a volumetric mean size ($D_{50}$) between 3 $\mu$m and 15 $\mu$m, and between 2 $\mu$m and 15 $\mu$m when the transparent microspheres 14 have a volumetric mean size ($D_{50}$) between 10 $\mu$m and 50 $\mu$m.

The optical diffusion film 6A may be in the form of rigid plate or in the form of flexible sheet or film. Mechanical characteristics and properties of the optical diffusion film 6A such as strength, rigidity and flexibility are determined by selecting materials and thickness of the transparent substrate 10 according to uses.

As was previously mentioned, the optical diffusion film 6A is desirably installed to various liquid crystal displays that include at least a liquid crystal panel and a backlight source. In particular, the liquid crystal panel that is used in combination with the optical diffusion film 6A is known in various types of mode such as TN mode and may take any type of mode well known in the art. Further, the backlight source that is used in combination with the optical diffusion film 6A is known in various forms and may take any form well known in the art as long as the backlight source produces a quantity of collimated light rays sufficient to generate an image sufficiently bright for observation.

The following description will be directed to examples of the process of producing an optical diffusion film according to the present invention.

EXAMPLE I

A transparent base layer 12 was formed by wire-bar coating an aqueous solution of material containing a 10 weight proportion of resin (water-soluble nylon: P-70; a product of Toray Industries, Inc.) and a four weight proportion of methyl gallate as a reducing material on a transparent substrate 10 made of polyethyleneterehutalate. The transparent base layer 12 had a thickness of 7 $\mu$m after it has been dried. Transparent glass microspheres 14 having a volumetric mean size ($D_{50}$) of 30 $\mu$m were closely distributed on the transparent base layer 12. The transparent glass microspheres 14 on the transparent base layer 12 were heated at 120° C. for 9 minutes and subsequently cooled down to a room temperature. As a result, each of the transparent glass microspheres 14 was partly embedded in the transparent base layer 12

Thereafter, a light absorbing layer 20 was formed by coating an aqueous solution of light absorbable material containing a seven weight proportion of silver behenite as a coloring material and a 20 weight proportion of gelatin over the transparent base layer 12. The aqueous solution of light absorbable material was coated to a thickness of 15 $\mu$m. The product was heated at 120° C. for 30 seconds to produce fine metal particles (metal silver particles) which formed a black layer having a thickness of 5 $\mu$m and cooled to a room temperature, thereby completing an optical diffusion film 6A(I).

In order to evaluate the optical diffusion film 6A(I), measurements of evenness of optical density (surface defects), transmission efficiency and viewing angle characteristics on gradation and chromaticity were made. A visual sensory analysis was conducted in order to evaluate evenness of optical density of the surface of the optical diffusion film 6A(I) as surface defects. Measurements of transmission efficiency were made under the 6A(I) as surface defects. Measurements of transmission efficiency were made under the Japanese Industrial standard K 7361-1 using a Haze meter (HR100 marketed by Murakami Color Engineering Laboratory). Viewing angle characteristic on gray scale and chromaticity were determined by measuring intensity of parallel light rays having a diverging angle less than five degree that entered and came out of the optical diffusion film 6A(I) on a silicon photodiode sensor of an angular distribution measuring instrument.

The visual sensory analysis proved that there was no such unevenness of optical density as to be recognizable as a surface defect was not detected on the surface of the optical diffusion film 6A(I). The measurements proved that the optical diffusion unit 6A had a satisfactorily superior transmission efficiency and a superior viewing angle characteristic on gray scale and chromaticity.

The result of investigation of liquid crystal displays with the optical diffusion film 6A(I) installed thereto revealed that the optical diffusion film 6A(I) was suitable for a liquid crystal display for, for example, a home television that was generally watched at a viewing distance of approximately 200 cm.

EXAMPLE II

An optical diffusion film 6A(II) was prepared and measured in the same manner as the optical diffusion film 6A(I) of Example I, except to employ transparent microspheres 14 having a volumetric mean size ($D_{50}$) of 8 μm and to coat an aqueous solution of light absorbable material to a thickness of 8 μm.

A visual sensory analysis proved that there was no such unevenness of optical density as to be recognizable as a surface defect was not detected on the surface of the 6A(II) had a satisfactorily superior transmission efficiency and a superior viewing angle characteristic on gradation and chromaticity.

The result of investigation of liquid crystal displays with the optical diffusion film 6A(II) installed thereto revealed that the optical diffusion film 6A(I) was suitable for a liquid crystal display for, for example, a desktop image display device that was generally watched at a viewing distance of approximately 300 cm.

EXAMPLE III

An optical diffusion film 6A(III) was prepared and measured in the same manner as the optical diffusion film 6A(I) of Example I, except to heat transparent glass microspheres 14 at 120° C. through a silicone rubber sheet having measurements of 1 mm×300 mm×210 mm over the transparent glass microspheres 14 while pressing them at a pressure of 0.01 kg/cm$^{-2}$.

A visual sensory analysis proved that there was no such unevenness of optical density as to be recognizable as a surface defect was not detected on the surface of the optical diffusion film 6A(III), and measurements proved that the optical diffusion unit 6A(III) had a satisfactorily superior transmission efficiency and a superior viewing angle characteristic on gradation and chromaticity.

The use of a silicone rubber sheet during heating and pressing the transparent glass microspheres 14 is effective in partly embedding the transparent glass microspheres 14 in the transparent base layer 12 sufficiently deep and uniformly. This leads to specifically high transmission efficiency.

Figure 6:
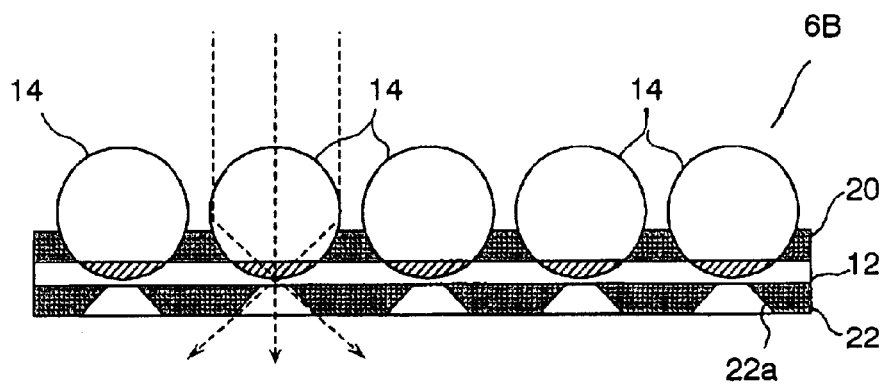
FIG. 6 is a cross-sectional view of an optical diffusion film according to an embodiment of the present invention.

FIG. 6 shows an optical diffusion film 6B according to an embodiment of the present invention. The optical diffusion film 6B comprises a transparent base layer 12, a first light absorbing layer 20 coated over on one surface of the transparent base layer 12, a layer of transparent microspheres or beads 14 distributed as uniformly as possible but in a random pattern on and partly embedded in both the first light absorbing layer 20 and the transparent base layer 12, and a second light absorbing layer 22 coated on another surface of the transparent base layer 12. The second light absorbing layer 22 has an arranged pattern of apertures or light transmissible areas (i.e. transparent areas) 22a mating the random pattern of transparent microspheres 14. Each transparent microspheres 14 partly left bare. The pattern of light transmissive areas 22a is not always necessary to precisely meet the random pattern of microspheres 14 but is desired to meet it to the extent that the optical diffusion film 6 ensures the intended diffusion effects. The second light absorbing layer 22 attenuates, block or diffuse light which is not part of a projected image but to transmit from the rear side to the front side that light which is part of the projected image without lowering transmittance.

The optical diffusion film 6B having a double-layered light absorbing structure provides a liquid crystal display or a screen with high contrast. Specifically, the first light absorbing layer 20 is contributory to improvement of image contrast, and the second light absorbing layer 22 is contributory to improvement of transmittance of the liquid crystal display or the screen.

There is no limitation on the transparent microspheres 14 as long as they are transparent. There are various materials employable as the transparent microspheres 14. The materials include, for example, glass, materials containing inorganic oxides, vinyl acetate resins, ethylene-vinyl acetate copolymers, vinyl chloride resins, vinyl chloride-vinyliden chloride copolymers, (meta)acrylic esters resins, butyral resins, silicone resins, polyester, vinyliden fluoride resins, cellulose nitrate resins, polystyrene, styrene-acrylic copolymers, urethane resins, polyethylene, polypropylene, polyethylene chroride, rosin derivatives and the like. These materials may be employed in the form of individuals or mixtures thereof. In the standpoint of optical characteristics, it is desirable to employ glasses, (meta) acrylic resins or materials containing inorganic oxides.

The transparent microspheres 14, which are desirably in the shape of rounded unitary elements but may not be perfect spheres, has no specific limitation on its size. The size of transparent microsphere 14 is desirably different according to standard viewing distances of display apparatuses in which the optical diffusion film 6B is used. The resolving power of human eyes is approximately 50 μrad to approximately 200 μrad. Accordingly, in order not to provide viewers with a feeling of coarseness of an image, the size of transparent microsphere 14 is desirably smaller than that corresponding to the resolving power of human eyes. For example, in the case where the optical diffusion film 6B is installed to a desktop display of, for example, a personal computer having a viewing distance of approximately 30 cm and to a home television having a viewing distance of approximately 200 cm, the size calculated on the basis of the resolving power of human eyes of 50 μrad that is accounted to be suitably applied in such the case is 15 μm for the optical diffusion film 6B of the desktop display and 100 μm for the optical diffusion film 6B of the television. With the consideration that the viewing distance practically varies to some extent according to displays, the volumetric mean size ($D_{50}$) used in the optical some extent according to displays, the volumetric mean size ($D_{50}$) used in the optical diffusion film 6B of the desktop display is preferably approximately 0.5 μm to approximately 50 μm in order for a variety of liquid crystal displays to provide well controlled granularity (i.e. not to provide viewers with a feeling of coarseness of an image), and more preferably it is approximately 0.5 μm to approximately 30 μm, and most preferably it is approximately 0.5 μm to approximately 12 μm.

The transparent microspheres 14 are desirably arranged as closely as possibly in order to provide a smooth image. More desirably the transparent microspheres 14 have different sizes and they are arranged so that a transparent microsphere 14 having a smaller size is placed between transparent microspheres having a larger size. In this way the layer of transparent microspheres 14 can be densely populated.

It is preferred to use a transparent microsphere having been treated so as to acquire a hydrophobic property on its surface. Since the microsphere 14 that has acquired the hydrophobic property has a poor affinity for the light absorbing layer, it easily shoves the light absorbing layer aside when it is embedded in the light absorbing layer. The treatment for providing the surface of microsphere with a hydrophobic property is known in various processes and may take any process well known in the art.

The first light absorbing layer 20 contains a light absorbable material such as resins with a black pigments such as carbon dispersed therein, a resin dyed to black, photosensitive coloring material of negative type and the like. In the case where the resin with a black coloring material dispersed therein or the resin dyed to black is used for the first light absorbing layer 20, the resin contains a photosetting material such as monomers and polymerization initiators. The negative type of photosensitive material is known in various forms including such a sliver halide photosensitive material for ordinary black-and-white negatives as described in the handbook of scientific photography, published by Maruzen Books. One of the photosensitive materials is such as to contain a triphenylmethane leuco dye precursor such as a leuco crystal violet, a photo-induced acid generator such as bromomethyl phenylsulfone, a radical generating material such as a lophine dimmer and a radical quencher such as phenydone all of which, outside of the radical quencher, are encapsulated in a microcapsule. The negative type of photosensitive material provides stable color development in such the way that exposed part generates radicals and oxidizes the leuco dye precursor with the radicals to develop a color and, on the other hand, unexposed part causes the radical quencher to enter the inside of the microcapsule through heating treatment so as thereby to terminate the color development. The color development mechanism is described in more detail in, for example, Japanese Unexamined Patent Publications Nos. 5-61190 and 9-218482.

There are many resins employable as a material of the first light absorbing layer 20 and the resins include vinyl acetate resins, ethylene-vinyl acetate copolymers, vinyl chloride resins, vinyl chloride-vinylidene chloride copolymers, (meta)acrylic ester resins, butyral resins, silicone resins, polyester, vinylidene fluoride resins, cellulose nitrate resins, polystyrene, styrene-acrylic copolymers, urethane resins, polyethylene, poly-propylene, polyethylene chloride, rosin derivatives, etc. and mixtures thereof Desirable for the monomer is a compound which is capable of additively polymerizing and has at least two unsaturated ethylene linkage. Specifically, any one can terminal ethylene linkages in one molecule thereof. For particularly preferred compounds are monomers, prepolymers namely dimmers and trimers, origomers mixtures thereof and compounds having chemical constitutions of copolymers thereof. Specifically, the preferred compounds include ester of an unsaturated carboxylic acid such as acrylic acid, metacrylic acids, itaconic acids, crotonic acids, isocrtonic acids, maleic acids and the like, an aliphatic compound of polyhydric alcohol, amide of an unsaturated carboxylic acid and an aliphatic compound of polyhydric amine, etc.

The ester (ester) consisting of the unsaturated carboxylic acid and the aliphatic compound of polyhydric alcohol are enumerated as follows:
Acrylate:
Ethylene glycol diacrylate; triethylene glycol diacrylate; 1,3-butane diol diacrylate; tetramethylene glycol diacrylate; propylene glycol diacrylate; neopentyl glycol diacrylate; trimethylol propan diacrylate; trimethylol propan (acryloyl oxypropyl) ether; trimethylol ethane triacrylate; hexane diol diacrylate; 1,4-cyclohexane diacrylate; tetraethylene glycoldiacrylate; pentaerythritol diacrylate; pentaerythritol diacrylate; pentaerythritol tetra-acrylate; dipentaerythritol diacrylate; dipentaerythritol hexaacrylate; sorbitol triacrylate; sorbitol tetraacrylate; sorbitol pentaacrylate; sorbitol hexaacrylate; tri((acryloyloxyethyl) isocyanurate; polyester acrylate oligomer, etc.
Methacrylate:
tetramethylene glycol dimetacrylate; triethylene glycol dimetacrylate; neopentyl glycol dimethacrylate; trimethylol propan trimethacrylate; trimethylol ethane trimethacrylate; ethylene glycol dimetacrylate; 1,3-butanediol dimetacrylate; hexanediol dimetacrylate; pentalene glycol dimetacrylate; 1,3-butanediol dimetacrylate; hexanediol dimetacrylate; pentaerythritol dimetacrylate; pentaerythritol trimetacrylate; pentaerythritol tetrametacrylate; dipentaerythritol dimetacrylate; dipentaerythritol hexametacrylate, sorbitol trimetacrylate; sorbitol tetrametacrylate; bis[p-(3-methacryloxy ethoxy) phenyl] dimwthylmethane; bis-[p-(methacryloxyethoxy)phenyl]dimethylmethane; etc.
Itaconates:
ethylene glycol diitaconate; propylene glycol diitaconate; 1,3-butanediol diitaconate; 1,4-butanediol diitaconate; tetramethylene glycol diitaconate; pentaerythritol diitaconate; sorbitol tetraitaconate, etc.
Crotonates:
ethylene glycol dicrotonate; tetramethylene glycol dicrotonate; pentaerythritol dicrotonate; sorbitol tetradicrotonate; etc.
Isocrotonates:
ethylene glycol diisocrotonate; pentaerythritol diisocrotonate, sorbitol tetraisocrotonate; etc.
Maleates:
ethylene glycol dimaleate; triethylene glycol dimaleate; pentaerythritol dimaleate; sorbitol tetramaleate; etc.

The amid (monomer) consisting of the unsaturated carboxylic acid and the aliphatic compound of polyhydric alcohol are enumerated as follows: methylene bis-acrylamid; methylene bis-methacrylamid; 1,6-hexamethylene bis-acrylamid; 1,6-hexamethylen bis-methacrylamid; diethylene triamine triacrylamid; xylylene bis-acryl- Other monomers may be employed as the photosetting material to be contained in the first light absorbing layer 20.

Japanese Patent Publication No. 48-41708 describes, as a photosetting material, a vinyl urethane compound having at least two vinyl groups in one molecule thereof such as polyisocyanate compound having at least two isocyanate group in one molecule thereof added with a vinyl monomer containing a hydroxyl group as represented by the following general structural formula (A).

$$CH_2=C(R)COOCH_2CH(R')OH \qquad (A)$$

where R and R' express H or $CH_3$.

Japanese Unexamined Patent Publication No. 51-37193 describes as a photosetting material urethane acrylate.

Japanese Unexamined Patent Publication No. 48-64183 and Japanese Patent Publications Nos. 49-43191 and 52-30490 describe polyester acrylate, multifunctional acrylate and methacrylate such as epoxy acrylate produced by reacting an epoxy resin with (meta)acrylic acid.

Further, Journal of the Adhesior Society of Japan, Vol. 20 1984, enumerates various materials available for photosetting monomer and photosetting oligomer.

The monomers mentioned above can be used in the form of individuals or mixtures thereof.

The monomer content of a solution of light absorbable material is desirably approximately 5 wt-% to approximately 30 wt-%, and more desirably approximately 10 wt-% to approximately 20 wt-%.

For the polymarization initiator, all compounds that can cause a monomer to initiate substantial photo-polymarization can be employed. In particular, desirably available are compounds that contain at least one component having an approximately 50 molecular absorbance in a wavelength range from approximately 300 nm to approximately 500 nm and are photosensitive to ultraviolet light.

Otherwise, the initiator may be a photo-exited sensitizer such as an activator that can generate active radicals accompanying a reaction of some kind with discoloring or fading dye as described belaw.

Desirably employable as the polymarization initiator are as follows: halogenated hydrocarbon derivatives; ketone compounds; ketoxime compounds; organic peroxides; thio compounds; hexaaryl biimidazole; aromatic onium salts; ketoxime ether; etc. Further, there are various kinds of chemical materials employable as the polymarization initiator such as aromatic ketone, lophine dimmers, benzoin, benzoin ethers, polyhalogen and mixtures thereof.

In particular, in terms of photosensitivity, shelf life and adhesion to a substrate, it is more desirably to select the polymerization initiator from the group of halogenated hydrocarbon compounds having a triazine skeleton, ketoxime compounds, hexaaryl biimidazole, mixtures of 4,4-bis(diethylamino) benzophenone and dimmer of 2-(o-chlorophenyl)-4,5-diphenylimidazole, 2-4 bis(trichloromethyl)-6-[4-(N,N-diethoxycarbonyl methylamino)-3-bromophenyl]-s-triazine, 4-[p-N,N-di(ethoxy carbonylmethyl)-2,6-di(trichloromethyl)-s-triazine].

Enumerated as the halogenated hydrocarbon compound having triazine skeleton in Bulletin of the Chemical Society of Japan, Vol. 42, 1969, are as follows: 2-phenyl-4,6-bis(trichloromethyl)-s-trazine; 2-(p-chlorophenyl)-4,6-bis(trichloromethyl)-s-triazine; 2-(p-tolyl)-4,6-bis(trichloromethyl)-s-triazine; 2-(p-methoxyphenyl)-4,6-bis(trichloromethyl)-s-triazine; 2-(2',4'-dichlorophenyl)-4,6-bis(trichloromethyl)-s-triazine; 2,4,6-tris-(trichloromethyl)-s-triazine; 2-methyl-4,6-bis(trichloromethyl)-s-triazine; 2-n-nonyl-4,6-bis(trichloromethyl)-s-triazine; 2-(α,α,β-trichloroethyl)-4,6-bis(trichloromethyl)-s-triazine; etc.

Further enumerated as the halogenated hydrocarbon compound having triazine skeleton in United Kingdom Patent No. 1,388,492 are as follows: 2-styryl-4,6-bis(trichloromethyl)-s-triazine; 2-(p-methylstyryl)-4,6-bis(trichloromethyl)-s-triazine; 2-(p-methoxystyryl)-4,6-bis(trichloromethyl)-s-tri-azine; 2-(p-methoxystyryl)-4-amino-6-trichloromethyl-s-triazine; etc.

Further enumerated as the halogenated hydrocarbon compound having triazine skeleton in Japanese Unexamined Patent Publication No. 53-133428, are as follows: 2-(4-methoxy-naphtho-1-yl)-4,6-bis-trichloromethyl-s-triazine; 2-(4-ethoxynaphtha-1-yl)-4,6-bis(trichloromethyl)-s-triazine; 2-[4-(2-ethoxyethyl)-naphto-1-yl]-4,6-bis(trichloromethyl)-s-triazine, 2-(4,7-di-methoxynaphto-1-yl)-4,6-bis(trichloromethyl)-s-triazine, 2-(acenaphtho-5-yl)-4,6-bis(trichloromethyl)-s-triazine; etc.

Further enumerated as the halogenated hydrocarbon compound having a triazine skeleton in German Patent No. 3,337,024 are as follows: 2-(4-styrylphenyl)-4,6-bis(trichloromethyl)-s-triazine; 2-(4-p-methoxystyrylphenyl)-4,6-bis(trichloromethyl)-s-triazine; 2-(1-naphtylvinylenephenyl)-4,6-bis(trichloromethyl)-s-triazine; 2-chloro-styryl-phenyl-4,6-bis(trichloromethyl)-s-triazine, 2-(4-thiophene-2-vinylenephenyl)-4,6-bis(trichloromethyl)-s-triazine; 2-(4-thiophene-3-vinylenephenyl)-4,6-bis(trichloromethyl)-s-triazine; 2-(4-furan-2-vinylenephenyl)-4,6-bis(trichloromethyl)-s-triazine; 2-(4-benzofuran-2-vinylenephenyl)-4,6-bis(trichloro methyl)-s-triazine; etc.

Enumerated as the halogenated hydrocarbon compound having a triazine skeleton in Journal of Organic Chemistry, Vol. 29, 1964, are as follows: 2-methyl-4,6-bis-(tribromomethyl)-s-triazine; 2,4,6-tris(tribromomethyl)-s-triazine; 2,4,6-tris(dibromomethyl)-s-triazine; 2-amino-4-methyl-6-(tribromomethyl)-s-triazine; 2-methoxy-4-methyl-6-trichloromethyl-s-triazine; etc.

Further enumerated as the halogenated hydrocarbon compound having a triazine skeleton in Japanese Unexamoned Patent Publication No. 62-58241 are as follows: 2-(4-phenylacethylenephenyl)-4,6-bis(trichloromethyl)-s-triazine, 2-(4-naphthyl-1-acethylenephenyl)-4,6-bis(trichloromethyl)-s-triazine; 2-(4-p-tolylacethylenephenyl)-4,6-bis(trichloromethyl)-s-triazine; 2-(4-p-methoxyphenylacethylenephenyl)-4,6-bis(trichloromethyl)-s-triazine; 2-(4-p-isopropylphenyl-acethylenephenyl)-4,6-bis(trichloromethyl)-s-triazine; 2-(4-p-ethyl phenyacethylenephenyl)-4,6-bis(trichloromethyl)-s-triazine; etc.

Further, enumerated as the halogenated hydrocarbon compound having a triazine skeleton in Japanese Unexamoned Patent Publication No. 5-281728 are as follows: 2-(4-trifluoromethylphenyl)-4,6-bis(trichloromethyl)-s-triazine; 2-(2,6-difluoro- phenyl)-4,6-bis(trichloromethyl)-s-triazine; 2-(2,6-dichlorophenyl)-4,6-bis(trichloromethyl)-s-triazine; 2-(2,6-dibromophenyl)-4,6-bis(trichloromethyl)-s-triazine; etc.

Employable as the ketoxime compounds are such as to be expressed by the following general formula (B).

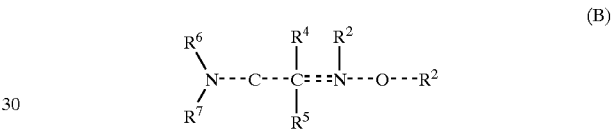

In the general formula (B), $R^2$ and $R^3$, which may independently have substituents, respectively and may be identical to or different from each other, express hydrocarbon groups that may have unsaturated linkages or heterocyclic groups. $R^4$ and $R^5$, which may independently have hydrogen atoms and/or substituents, respectively and may be identical to or different from each other, express hydrocarbon groups that may have unsaturated linkages, heterocyclic groups, hydroxyl groups, oxy-substituents, merecapto groups or thio-ubstituents. Furthr, $R^4$ and $R^5$ may link together to form a ring and, in this case, express alkylene groups of a carbon number of 2 to 8 that may include at least one divalent group selected from the group of —O—, —$NR^6$—, —O—CO—, —NH—CO—, —S— and —$SO_2$— as a principal chain of the ring. $R^6$ and $R^7$, which may independently have hydrogen atoms and/or substituents, respectively, express hydrocarbon groups that may have unsaturated linkages or carbonyl substituents.

Compounds expressed by the general formula (B) are as follows but not limited thereto: p-methoxyphenyl-2-N;N-dimethyl aminopropyl ketoneoxime-O-aryl-ether; p-methylthio phenyl-2-morpholinopropyl ketonoxime-O-arylether; p-methylthiophenyl-2-morpholinopropyl ketonoxime-O-benzylether; p-methylthiophenyl-2-morpholinopropyl-ketonoxime-O-n-butylether; p-morpholinophenyl-2-morpholinopropyl ketonoxime-O-arylether; p-methoxyphenyl-2-morpholinopropyl ketonoxime-O-dodecylether; p-methylthiophenyl-2-morpholinopropyl ketonoxime-O-methoxy ethoxyethylether; p-methylthiophenyl-2-morpholinopropyl ketonoxime-O-p-methoxy carbonyl benzylether; p-methylthiophenyl-2-morpholinopropyl ketonoxime-O-methoxycarbonylmethylether; p-methylthiophenyl-2-morpholinopropyl ketonoxime-O-ethoxycarbonylmethylether; p-methylthiophenyl-2- morpholinopropyl ketonoxime-O-4-butoxycarbonylbutylether; p-methylthiophenyl-2-morpholinopropyl ketonoxime-O-2-ethoxycarbonylethylether; p-methylthiophenyl-2-morpholinopropyl ketonoxime-O-methoxycarbonyl-3-propenylether; p-methylthiophenyl-2-morpholinopropyl ketonoxime-O-benziloxy carbonyl methylether; etc.

Employable as the hexaaryl biimidazole are as follows: 2,2'-bis(o-chlorophenyl)-4,4',5,5'-tetraphenyl biimidazole; 2,2'-bis(promophenyl)-4,4',5-5'-tetraphenylbiimidazole; 2,2'-bis(o,p-dichlorophenyl)-4,4',5,5'-tetraphenyl biimidazole; 2,2'-bis(o-chlorophenyl)-4,4',5,5'-tetra(m-methoxyphenyl) biimidazole; 2,2'-bis(o, o' dichlorophenyl)-4,4',5,5'-tetraphenyl biimidazole; 2,2'-bis(o-nitrophenyl)-4,4',5,5'-tetraphenyl biimidazole; 2,2'-bis(o-methylphenyl)-4,4',5,5'-tetraphenyl biimidazole; 2,2'-bis(torifuloro methylphenyl)-4,4',5,5'-tetra-phenyl biimidazole; etc.

These biimidazole can be easily composed by methods such as disclosed in, for example, Bulletin of the Chemistry Society of Japan, Vol. 33, 1960, and Journal of Organic Chemistry, Vol. 36, 1971.

Employable as the ketoneoxim ether are as follows: 3-benzoyloxy iminobutane-2-one; 3-acetoxy iminobutane-2-one; 3-propionyloxy iminobutane-2-one; 2-acetoxy iminopentane-3-one; 2-acetoxy imino-1-phenylpropane-1-one; 2-benzoyloxy imino-1-phenylpropane-2-one; 2-ethoxycarbonyloxy imino-1-phenyl-propane-1-one; etc.

The polymarization initiators enumerated above may be used in the form of individuals or mixture The initiator content of a solution of light absorbable material is desirably approximately 0.1 wt-% to approximately 5 wt-%, and more desirably approximately 0.2 wt-% to approximately 1.0 wt-%.

The transparent base layer 12 preferably comprises a resin that is light transmissible and capable of fixing the microspheres 14 thereby. More desirably it comprises a thermo plastic resin so that the transparent microspheres 14 can be partly embedded in the transparent base layer 12. Specifically, desirably employable as the thermal plastic resins are as follows: vinyl acetate resins; ethylene-vinyl acetate copolymers; vinyl chloride resins; vinyl chloride-vinylidene chrolyde copolymers; (meta)acrylic ester resins; butyral resins; silicon resins; polyester; vinyliden fluoride resins; cellulose nitrate resins; polystyrne; styrene-acrylic copolymers; urethane resins; polyethylene; polypropylene; polyethylene chloride; rosin derivatives; water-soluble nylon; and mixtures thereof.

The transparent base layer 12 has no limitation on its thickness but preferably has such a thickness that the transparent base layer 12 can fix uniformly the transparent microspheres 14 thereon and prevents them from peeling off. Although the thickness of the transparent base layer 12 can not be determined indiscriminately because it depends upon sizes of the transparent microspheres 14, the transparent base layer 12 is desirable as thick as more than half the volume of each transparent microsphere 14 is left bare from the transparent base layer 12. However, if the transparent base layer 12 is too thick, the optical diffusion film 6B tends to lower contrast of a projected image. When using transparent microspheres 14 having a volumetric mean size ($D_{50}$) between approximately 0.5 $\mu$m and approximately 50 $\mu$m, the thickness of the transparent base layer 12 is desirably between approximately 0.1 $\mu$m and approximately 15 $\mu$m, and more desirably between approximately 0.1 $\mu$m and approximately 12 $\mu$m, and most desirably approximately 0.1 $\mu$m and approximately 9 $\mu$m.

The second light absorbing layer 22 consists of light transmissible areas 22a that are highly light transmissible and opaque areas that are light absorbable. That is, the second light absorbing layer 22 comprises a patterned light absorbing area. For example, the second light absorbing layer 22 can be made by coloring a specific area in a desired pattern leaving the remaining area for the light transmissible areas transparent or can be made by using a light absorbable material for the light absorbable areas and a light transmissible material for the light transmissible areas. Otherwise, the second light absorbing layer 22 may be formed by a light absorbable layer having apertures corresponding in location to the transparent microspheres 14. With the consideration that the diffusion film 6B is fabricated using self-aligning exposure which will be described later, the second light absorbing layer 22 is desirably formed by coloring areas for the light absorbable areas only of a transparent member.

The second light absorbing layer 22 has no limitations on its material as long has the above mentioned structure can be realized. The same light absorbable materials as those for the first light absorbing layer 20 can be employable. In light of using the self-aligning exposure, it is preferred to employ a positive type of photosensitive coloring material in terms of quality of producing efficiency.

Employable as constitutional resins for the second light absorbing layer 22 are as follows: vinyl acetate resins; ethylene-vinyl acetate copolymers; vinyl chloride resins; vinyl chloride-vinylidene chloride copolymers; (meta) acrylic ester resins; butyral resins; silicone resins; polyester; vinylidene fluoride resins; cellulose nitrate resins; polystyme; styrene-acrylic copolymers; urethane resins; polyethylene; polypropylene; polyethylene chloride; rosin derivatives; and mixtures thereof.

Employable as the positive type of photosensitive coloring material is, for example, one that contains heat-sensitive microcapsules involving an electron-donating achromatic dye, a compound having an electron acceptor and a vinyl monomer in a single molecule and a photo-polymerization initiator. These compound and initiator are outside the microcapsule. When the photosensitive coloring material is exposed, the composition of these compound and initiator outside the heat-sensitive microcapsule (curable composition) is polymerized or cured and fixed. In consequence, the compound does not move even when heated. On the other hand, when the photosensitive coloring material is not exposed, the curable composition is not fixed even when heated. Therefore, the electron acceptor that has mobility and the compound having an electron acceptor and a vinyl monomer or an electron acceptable compound move within the photosensitive coloring material, so as to develop the electron-donating achromatic dye in the microcapsule, thereby forming a positive picture element. Materials employable as the positive type of photosensitive coloring material are enumerated in Japanese Unexamined Patent Publication No. 10-226174.

Otherwise, coloring materials (photosensitive heat-developing recording materials) such as described in Japanese Unexamined Patent Publications Nos. 3-87827 and 4-211252 are desirably employable as long as they are of the positive type of photosensitive coloring material. Further, employable as the positive type of photosensitive coloring material is such a positive type of diazo photosensitive heat-sensitive material (photosensitive heat-developing material) that contains at least a diazonium salt, a coupler and a base and is colored when exposed and heated.

The photosensitive coloring material is, in a desirable form, such as to have an oil-soluble diazonium salt involved in microcapsules and emulsified coupler and base dispersed outside the microcapsules as well as a sensitizing material and the like as described in, for example, Japanese Unexamined Patent Publication No. 4-261893. When the photosensitive coloring material is exposed, the diazonium salt loses its coupling function, so that it does not develop a color. On the other hand, when the photosensitive coloring material remains unexposed, the coupler, the base and the sensitizing material that are fused by heat enter the microcapsules and causes a coupling reaction with the diazonium salt therein, so as thereby to develop a color.

Desirably employable as the positive type of photosensitive coloring material is, for example, one that contains a positive type of silver halide photosensitive emulsion. This silver halide photosensitive emulsion is not colored when exposed but is, when unexposed, colored by a photographic processing including development, fixation and rinsing. There are various materials desirable for the silver halide photosensitive emulsion such as direct positive emulsions for microduplicate films and roentgen duplicate films.

Generally, a negative type of silver halide photosensitive emulsion produces sensitivity specks when exposed and the sensitivity specks are reduced to black metal silver particles through development. On the other hand, when the positive type of silver halide photosensitive emulsion includes silver halide that is pre-exposed and added with a desensitizing dye, the silver halide is not reduced even when exposed but is reduced to become colored silver. Such the positive type direct positive emulsion is described in Handbook of Scientific Photography published by Maruzen Books. It is desirable for the positive type of silver halide photosensitive emulsion to use a processing solution for ordinary black-and white emulsions in the photographic processing including development, fixation and rinsing.

The second light absorbing layer has no limitation on its thickness as long as it prevents the optical diffusion film from dropping its contrast. When employing transparent microspheres having a volumetric mean size ($D_{50}$) between approximately 0.5 μm and approximately 50 μm, the thickness of the second light absorbing layer is desirably between approximately 0.3 μm and approximately 30 μm.

Figure 7:
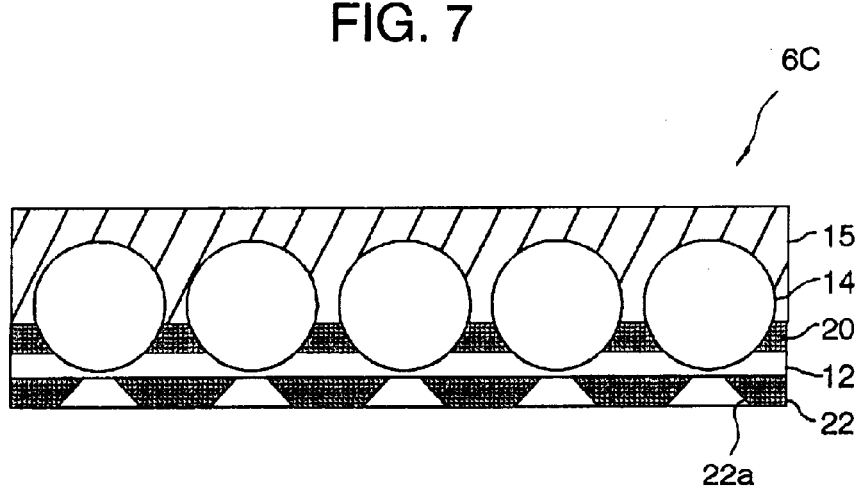
FIG. 7 is a cross-sectional view of an optical diffusion film according to another embodiment of the present invention.

FIG. 7 shows an optical diffusion film 6C according to another embodiment of the present invention. The optical diffusion film 6C is the same in structure and operation as the optical diffusion film 6B previously described only except to have a transparent binder layer 15 over the layer of transparent microspheres 14 and the first light absorbing layer 20.

The transparent binder layer 15 is highly light transmissible and is used to adhere the optical diffusion film 6C to a liquid crystal display using, if desirably, heat. Further, although a transparent substrate is separated from the optical diffusion film in order to coat the second light absorbing layer when the self-aligning exposure is used in the process of producing the optical diffusion film, the transparent binder layer 15 provides the optical diffusion film 6C with a mechanical strength as high as necessary when the second light absorbing layer is coated.

There are various types employable as binder material for the transparent binder layer such as a solution type, a hot-melt type, a pressure sensitive type, etc. Specifically, the binder materials employable as binder material for the transparent binder layer include acrylic resins, polycarbonate resins, vinyl chloride resins, resins of polyolefin group, resins of polyester group, resins of polystyrene group and the like. These resins are selected in consideration of refractivity of the transparent microspheres 14. The transparent binder layer 15 has no limitation on its thickness and desirably has high surface smoothness in light of high binding property. For this reason, the transparent binder layer is desirable to have a thickness as thick as it completely cladding surface irregularities of the optical diffusion film due to the matrix player of transparent microspheres 14.

Figure 8:
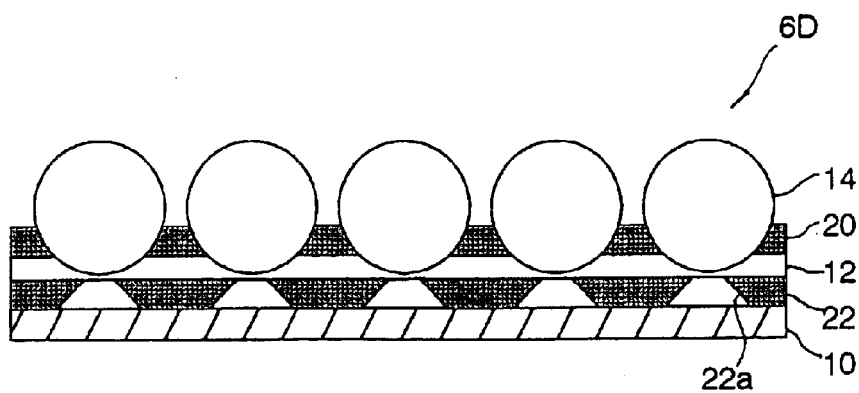
FIG. 8 is a cross-sectional view of an optical diffusion film according to an embodiment of the present invention.

FIG. 8 shows an optical diffusion film 6D according to still another embodiment of the present invention. The optical diffusion film 6D is the same in structure and operation as the optical diffusion film 6B previously described only except to have a transparent substrate 15 on which the optical diffusion film is formed.

Figure 5:
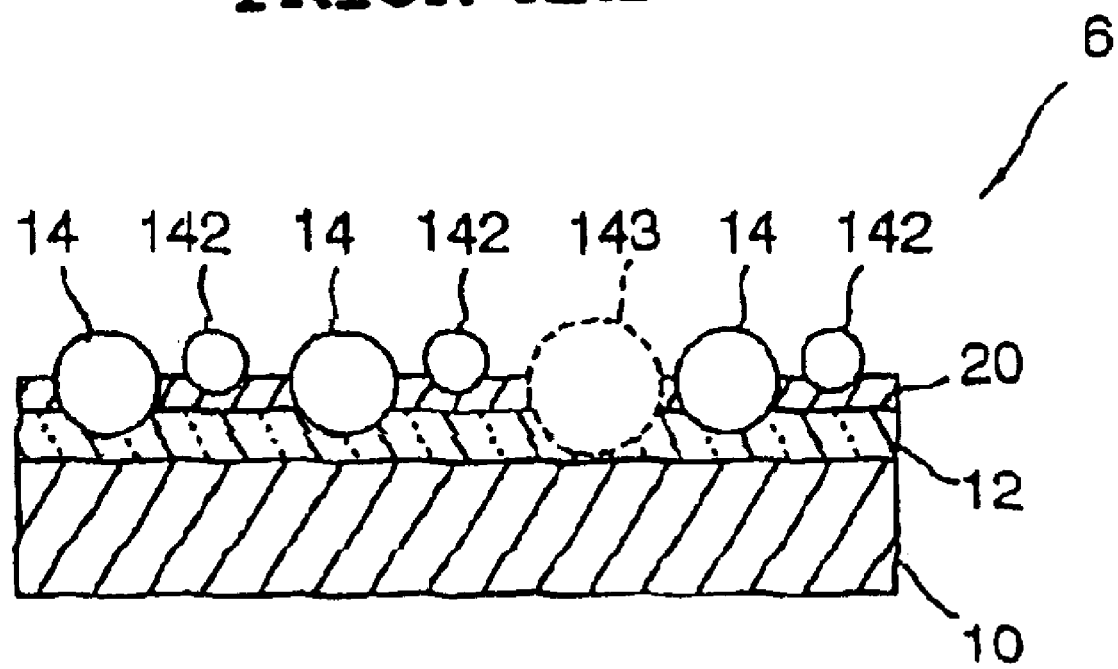
FIG. 5 is an explanatory cross-sectional view of an optical diffusion film including extraordinary different sizes of transparent microspheres.

The transparent substrate 10 has a mechanical strength sufficient according to displays to which the optical diffusion film 6D is applied. Specifically, the transparent substrate 10 may comprises the same material as that of the optical diffusion film 6A shown in FIG. 5.

Though there is no limitations on the process of producing the optical diffusion films 6B–6D described above, it is desirable to employ the self-aligning exposure described below in the process of producing the optical diffusion film in light of production quality and efficiency.

The self-aligning exposure is a technique of forming the light absorbing layer by exposing the second light absorbing layer 22 to light in a given pattern through the layer of transparent microspheres 14 and developing it so as to develop a colored pattern. That is, the second light absorbing layer 22 having a patterned transparent areas 22a is formed by exposing a layer of a positive type photosensitive coloring material that is colored at exposed parts and remains transmissible at unexposed parts. Specifically, A layer of the photosensitive coloring material formed on the under side of the transparent base layer 12 is exposed to light through the matrix layer of transparent microspheres 14 from the side of the first light absorbing layer 20 and thereafter developed. The exposed area of the layer of photosensitive coloring material, which has the same pattern as the layer of transparent microspheres 14, remains light transmissible even when it is develop. On the other hand, the remaining part, i.e. the unexposed part, of the solution layer of photosensitive coloring material, that has a pattern complementary to the random pattern of distribution of the transparent microsphere 14, is colored when it is developed. In consequence, the second light absorbing layer 22 thus formed has transparent areas 22a arranged in a pattern mating the distribution pattern of transparent microspheres 14. The use of the self-aligning technique eliminates aligning the transparent areas 22a with the transparent microspheres 14 in substantial position, respectively, so that the process of producing the optical diffusion film is simplified. This provides the optical diffusion film producing process with high efficiency and optical diffusion films with high quality.

Figure 9:
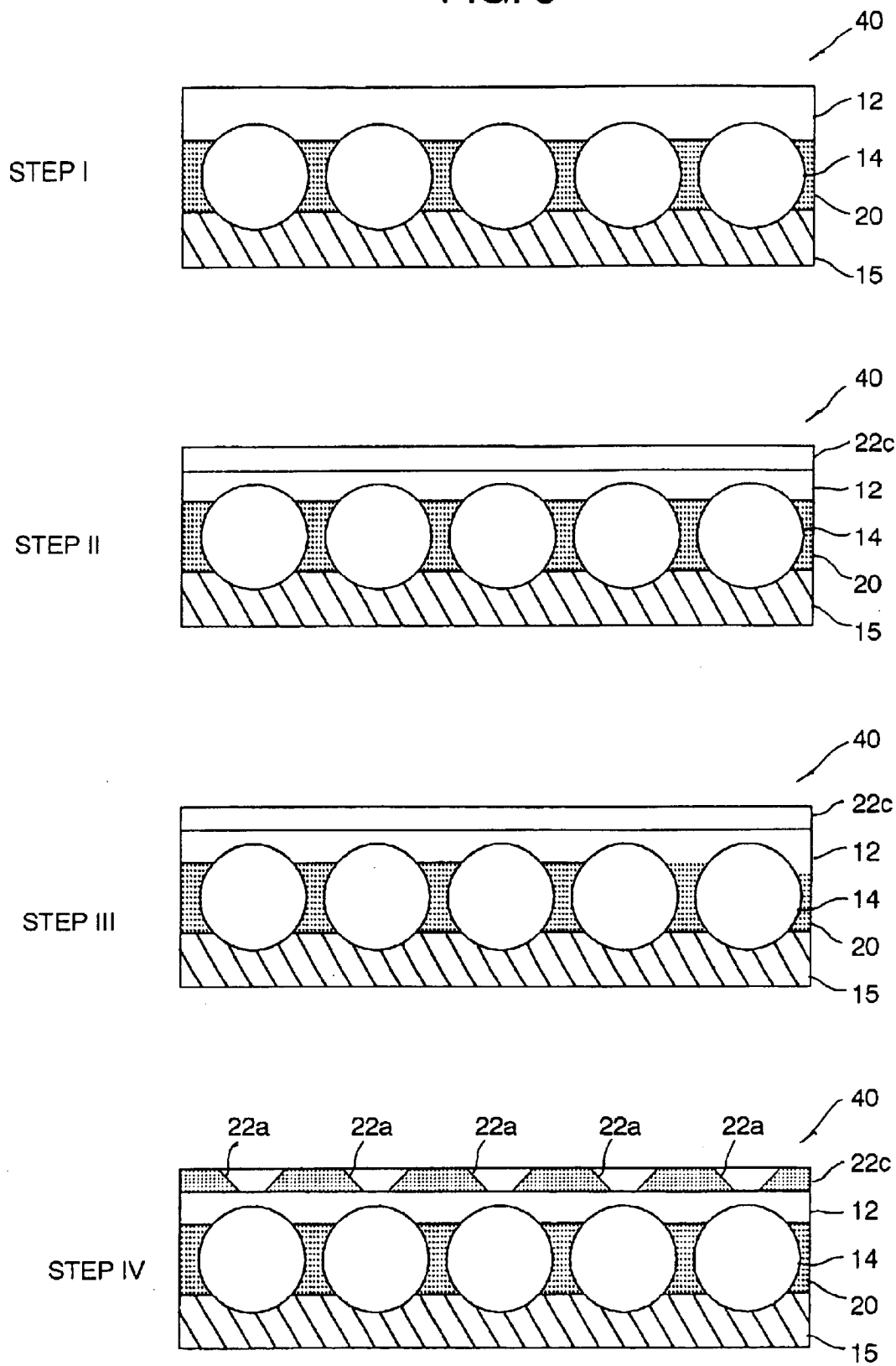
FIG. 9 is an illustration showing the general idea of self-aligning exposure used in a step of forming a second light absorbing layer.

FIG. 9 shows fundamental self-aligning exposure for forming a light absorbing layer having transparent areas arranged in a pattern mating the distribution pattern of transparent microspheres 14 that is used in the process of producing the optical diffusion film 6C shown in FIG. 7.

As shown in FIG. 9, an intermediate product 40 is prepared (step I). The intermediate product comprises a transparent base layer 12, a layer of transparent microspheres 14 over the transparent base layer formed so that each transparent microsphere 14 is partly embedded in the transparent base layer 12, a light absorbing layer 20 as a first light absorbing layer formed over the transparent base layer 12 leaving each said transparent microsphere 14 partly bare, and a transparent binder layer 15 formed over the light absorbing layer and the layer of transparent microspheres 14.

A layer 22c comprising a positive type of photosensitive coloring material is formed as a preparatory light absorbing layer over the transparent base layer 12 (step II). Thereafter, the preparatory light absorbing layer 22c is exposed to collimated light rays L from the side of the transparent binder layer 15 (step III). The light rays L pass through the transparent binder layer 15 and enter each of the transparent microspheres 14. The light rays L that come out of the transparent microspheres 14 as diverging light rays L' pass through the transparent base layer 12 and then the preparatory layer 22c. However, the light rays L that miss the transparent microspheres 14 are absorbed by the light absorbing layer 20. In consequence, the preparatory layer 22c is exposed to the converging light rays L' in the same pattern as the distribution pattern of the transparent microspheres 14. When the preparatory layer 22c after exposure is developed, the preparatory layer 22c is colored at unexposed parts in a pattern complementary to the matrix patter of the layer of transparent microspheres 14 and, however, left at exposed parts transparent in a pattern mating the distribution pattern of the transparent microspheres 14, so as thereby to be converted to a light absorbing layer 22 having transparent areas arranged in a pattern mating the distribution pattern of the transparent microspheres 14 (step IV). This self-aligning exposure can be employable regardless of whether the preparatory layer 22c has the transparent binder layer 15.

The exposure of the preparatory layer 22c is carried out using, for example, a xenon (Xe) lamp. An exposure time is selected according to a thickness of the preparatory layer 22c. Though there are various processes of developing the preparatory layer 22c known in the art, a heat developing process is desirable in light of working efficiency. Heating time and temperature are selected according to a thickness of the preparatory layer 22c.

There is no limitations on the process of producing the optical diffusing film except the process of forming light absorbing layer 22 by the self-aligning exposure, nevertheless, the following process is more desirable in order to efficiently perform the self-aligning exposure.

Figure 10:
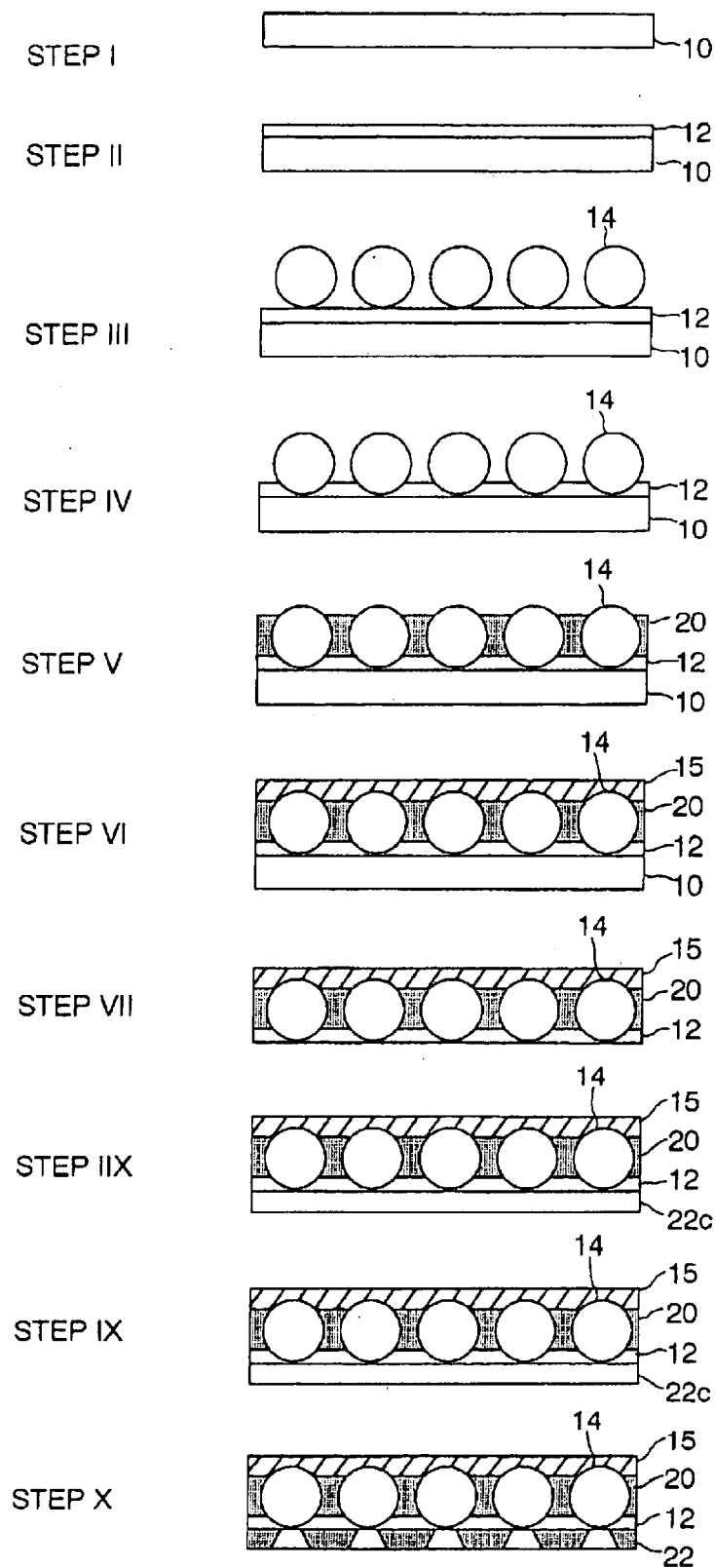
FIG. 10 is an illustration showing the general idea of an optical diffusion film producing process according to an embodiment of the present invention.

FIG. 10 shows a process of producing an optical diffusion film including the self-aligning exposure. As shown in FIG. 10, a transparent substrate 10 is prepared (step I). A transparent base layer 12 is formed on the transparent substrate 10 by coating a solution of thermoplastic resin and drying it (step II). Subsequently, a number of transparent microspheres 14 are closely distributed over the transparent base layer 12 so as to form a matrix layer of transparent microspheres 14 on the transparent base layer 12 (step III) and then heated and pressed against the transparent base layer 12 so as to until the transparent microspheres 14 is partly embedded in the transparent base layer 12 (step IV). Embedding the transparent microspheres 14 in the transparent base layer 12 before forming a light absorbing layer 20 makes it reliable to provide an embedded depth of the transparent microspheres 14 in the transparent base layer 12 sufficient for light rays to come out of the transparent microspheres 14 even though transparent microspheres 14 are somewhat ununiform in embedded depth or thickness.

It is desirable that transparent microspheres 14 are distributed as close as possible and embedded in depth as uniform as possible. The transparent microspheres 14 that are uniform in embedded depth provide the optical diffusion film with uniform brightness distribution over the surface of the optical diffusion film and high transmission efficiency. Further, the transparent microspheres 14 that are distributed closely to one another provide the optical diffusion film with high transmission efficiency and an image surface free from coarse images.

One of employable manners of distributing transparent microsphers 14 closely to one another on the transparent base layer 12 is to use transparent microspheres having different sizes in a range, in particular, between approximately 0.5 $\mu$m and approximately 50 $\mu$m. It is desirable to embed each transparent microsphere 14 so that more than half the volume of each transparent microsphere 14 is left bare from the transparent base layer 12. This results in providing the optical diffusion film with high transmission efficiency. When the transparent microspheres 14 are embedded, they may be heated at a temperature as high as the transparent base layer 12 is so soft as to cave in when the transparent microspheres 14 are pressed. Heating the transparent base layer 12 makes it easy to embed the transparent microspheres 14 sufficiently in the transparent base layer 12. In order to embed the transparent microspheres 14 uniformly in depth in the transparent base layer 12, it is desirable to press the transparent microspheres 14 through a heat conductive flexible sheet such as a silicone rubber sheet put over the transparent microspheres 14 during heating them.

Subsequently, a light absorbing layer 20 is formed by coating a solution of light absorbing material over the transparent base layer 12 and the layer of transparent microspheres 14 so as to leave the transparent microspheres 14 partly bare (step V). The solution of light absorbing material contains a light absorbing material and, if necessary, a surface active material and a solvent. There are various solvents such as methyl ethyl ketone, propylene glycol mono-methyl ether acetate, etc. which are employable in the form of individuals or mixtures thereof. The surface active material is known in various forms and may take any well known form. The solution of light absorbing material desirably contains a less than 0.1 wt-% of surface active material. When the solution of light absorbing material contains a less than 0.1 wt-% of surface active material, it has lower affinity, namely lower wettability, with the transparent microsphere 14, so that a less amount of redundant margin of light absorbing material are left on the transparent microsphere 14. This makes removal of the redundant flashes of light absorbing material from the transparent microsphere 14 if it is necessary as will be described later. The term "redundant margin of light absorbing layer" as used herein refers to a portion of the layer of light absorbing material that spreads into an intended light transmissible area of a transparent microsphere 14. In addition, when it is necessary to remove the redundant flashes of light absorbing material from the transparent microsphere 14 as will described later, it is easy to remove the redundant flashes of light absorbing material from the transparent microsphere 14 and, in consequence, to provide the transparent microsphere 14 with an ensured light transmissible area. This effect is more intensified in the case where the transparent microsphere 14 has given a hydrophobic property.

When it is necessary to remove redundant flashes of light absorbing material from the transparent microsphere 14 in the step of forming the light absorbing layer 20, it is desirable to use a negative type photosensitive coloring material for the light absorbing material. In this case, a solution layer of negative type photosensitive coloring material is formed over the transparent base layer 12 and the layer of transparent microspheres 14. The solution layer of negative type photosensitive coloring material is exposed in a pattern complementary to the distribution pattern in which the transparent microspheres 14 are distributed and then cured and converted to a solid layer of negative type photosensitive coloring material as the light absorbing layer 20.

There is no limitations on the exposure and any methods that can expose the solution layer of negative type photosensitive coloring material in the pattern complementary to the distribution pattern of the transparent microspheres 14 are employable. In particular, the exposure is desirably made from the side of the transparent substrate 10 using ultraviolet light. In the case of employing this method, the negative type photosensitive coloring material contains a material that is cured by ultraviolet light and, on the other hand, the transparent microsphere 14 contains an ultraviolet light absorber or is covered by a film of ultraviolet absorber that is formed by vacuum evaporation or coating. By using these ultraviolet curing negative type phorosensitive coloring material and ultraviolet absorbing transparent microspheres, even though exposure is made over the entire layer of negative type photosensitive coloring material, the layer of negative type photosensitive coloring material only at parts not overlaying the transparent microspheres 14 is effectively exposed.

When exposing the layer of ultraviolet absorbing transparent microspheres 14 and the solution layer of ultraviolet curing negative type photosensitive coloring material from the side of the transparent substrate 10, ultraviolet light incident upon the transparent microspheres 14 is absorbed by the ultraviolet light absorber, so that no ultraviolet light rays pass through the transparent microspheres 14. As a result, no ultraviolet light rays reach the solution layer of ultraviolet curing negative type photosensitive coloring material right under and around the transparent microspheres 14, so that the unexposed parts of the solution layer of ultraviolet curing negative type photosensitive coloring material are not cured. The uncured parts of the solution layer of ultraviolet curing negative type photosensitive coloring material can easily be removed with, for example, solvents. This provides the transparent microsphere 14, and hence the optical diffusion film, with a large light transmissible area, a high transmittance, a fine characteristic of viewing angle and less unevenness of brightness distribution. A desirable content of ultraviolet light absorber of the transparent microsphere 14 is approximately 15 wt-% to approximately 95 wt-%. When the content of ultraviolet light absorber is in this extent, the transparent microspheres 14 shows an ultraviolet absorbing effect sufficient to prevent the parts of the solution layer of ultraviolet curing negative type photosensitive coloring material on, under and around the transparent microsphere 14 from curing. It is also desirable to use a transparent microsphere 14 with a film of ultraviolet light absorber film formed thereon by vacuum evaporation or coating. There are various materials employable as the ultraviolet light absorber such as titanium oxides, zinc oxides, phtharocyanine pigments, benzotriazole ultraviolet absorbers and the like. Above all, titanium oxides are most desirable in light of high diffusibility.

In the case of employing a transparent microsphere 14 having acquired hydrophobic property, the transparent microsphere 14 shows low affinity or wetability with the solution of light absorbing material. This results in a reduction in amount of the solution of light absorbing material left on the transparent microsphere 14 and spreading under the transparent microsphere 14. In consequence, it is easily realized to provide the transparent microspheres 14 with uniformity of light transmissible areas, which leads to an optical diffusion film having high transmittance There are various treatment of providing the transparent microsphere 14 with hydrophobic property that have been known in the art. One of the treatment is to immerse the transparent microsphere 14 in an F-type silane coupling solution for one hour.

The cured thickness of the layer of light absorbing material can be controlled according to exposure conditions. In the case where the ultraviolet light exposure is made from the side of the transparent substance 10, the transparent substrate 10 is essential to be visible and ultraviolet light transmissible.

In the step of forming the light absorbing layer 20, it is desirable to remove redundant flashes of light absorbing material left on the transparent microspheres 14. The removal of the redundant flashes of light absorbing material is performed by controlling a depth of removal according to conditions of removal such as temperature, pressure, time and the like. There is no limitations on removing methods as long as they can uniformly remove the redundant flashes of light absorbing material from the transparent microspheres 14. In light of precise removal of fine redundant flashes of light absorbing material and less contamination of the transparent microsphere surfaces, it is desirable to employ dry-etching such as plasma etching and reactive-ion etching which are known in the art and, more desirable, to employ low temperature plasma etching. Most desirable is oxygen plasma etching which is one of the low temperature plasma etching and in which oxygen is used as a reactive gas. The plasma etching is performed described below.

An intermediate product formed with the light absorbing layer 20 is put in a cylindrical quartz chamber depressurized and filled with a reactive gas. The quartz chamber is then put in an electric field to produce plasma so as thereby to produce highly activated reactive species (radicals). The oxygen plasma etching is the etching technique that uses oxygen as a reactive gas and generates oxygen radicals for etching redundant flashes of light absorbing material on the transparent microspheres 14. The removal of redundant flashes of light absorbing material by the oxygen plasma etching is uniform over the transparent microspheres 14, this provides the optical diffusion film 6 with light transmissible area as large as possible, high transmittance, an improved characteristic of viewing angle and less unevenness of brightness distribution due to changes in thickness of the light absorbing layer 20. The same is true for the light absorbing layer made of a negative type photosensitive coloring material. It is desirable to use solvents, such as methylethylketone, propyleneglycol-monomethylether acetate, etc., or alkaline developing solutions in removing the unexposed part of the solution layer of photosensitive coloring material.

Thereafter, a transparent binder layer 15 is formed by coating a solution containing an acrylic resin over the layer of transparent microspheres 14 and the first light absorbing layer 20 (step VI) in a known manner. Subsequently, the transparent substrate 10 is peeled apart from the intermediate product prior to form a light absorbing layer 22 over the transparent base layer 12 (step VII). When the transparent substrate 10 is peeled apart, although the intermediate product possibly looses structural strength to some extent, it still has structural strength sufficient to form a light absorbing layer because it is backed up by the transparent base layer 12.

After peeling the transparent substrate 10 apart from the intermediate product, a solution of light absorbing material is coated over the transparent base layer 12 in a known manner and dried so as thereby to form a preparatory light absorbing layer 22c (step IIX). When it is intended to form a given pattern of light absorbing layer by heat developing, it is desired to form the preparatory light absorbing layer 22c using heatless coating machines such as a wire coating machine, a curtain-flow coating machine, an extrusion dye coating machine, an air doctor coating machine, a blade coating machine, a rod coating machine, a knife coating machine, a squeeze coating machine, a reverse roll coating machine, a bar coating machine and the like.

The preparatory light absorbing layer 22c is exposed to light from the side of the transparent binder layer 15 by the self-aligning exposure as previously described (step IX) and developed so as thereby to a light absorbing layer 22 having transparent areas arranged in a pattern mating the distribution pattern of the transparent microspheres 14 (step X).

The process including steps I to X makes the transparent microspheres 14 embedded sufficiently and successfully in the transparent base layer without damages due to over pressurization and, in consequence, provides the optical diffusion film having an image surface that easily causes stable isotropic light diffusion, has superior contrast and provides viewers with no feeling of coarseness of an image.

The following description will be directed to examples of an optical diffusion film produced by the process described above.

EXAMPLE IV

An optical diffusion film 6IV as an example was produced by coating a solution of water soluble nylon (P-70, a product of Toray Industries, Inc.) over a transparent substrate 10 of polyethylene-terephthalate (PET) using a wire-bar coating machine and drying the solution layer of water soluble nylon so as thereby to a transparent base layer 12, The dried transparent base layer 12 was 1 $\mu$m in thickness. After uniformly and closely distributing a number of transparent glass microspheres 14 (which was 6 $\mu$m in volumetric mean size ($D_{50}$) and contained 39 wt-% of titanium oxide), the transparent base layer 12 was heated at 120° C. for nine minutes so as to soften up sufficiently in order to embed partly the transparent glass microspheres 14 therein. After having embedded the transparent temperature so as to fix the embedded transparent glass microspheres 14 therein, thereby forming a layer of transparent glass microspheres 14.

A solution of light absorbing material for a light absorbing layer was separately prepared by dispersing carbon black particles in an organic solvent with an acrylic resin dissolved therein. This solution of light absorbing material was not added with a surface active material. A light absorbing layer 20 was formed by coating the solution of light absorbing material over the transparent base layer 12 and then drying it. In consideration of the volume of the transparent glass microspheres 14, the coating amount of the solution of light absorbing material was adjusted so that the light absorbing layer 20 had a thickness of 2 $\mu$m. The solution of light absorbing material was repelled by surfaces of the transparent glass microspheres 14 and filled up only between adjacent transparent glass microspheres 14. Thereafter, a transparent binder layer 15 was formed by coating a solution of acrylic resin over the light absorbing layer 20 and the layer of transparent glass microspheres 14 that remained partly bare and then drying it. The transparent binder layer 15 has a refractivity of 1.5.

Thereafter, the transparent substrate 10 was peeled apart from the intermediate product. A solution of light absorbing material for a light absorbing layer 22 was separately prepared. A light absorbing layer 22 was formed by coating the solution of light absorbing material over the transparent base layer 12 at the side remote from the light absorbing layer 20 and then drying it. The solution of light absorbing material contained a diazonium salt encapsulated in a microcapsule and coupler and base emulsified and dispersed outside the microcapsules as well as a sensitizing material therein. The solution of light absorbing material also contained gelatin as a binder. The amount of the solution of light absorbing material was adjusted so that the light absorbing layer 22 had a thickness of 2 $\mu$m. The solution layer of light absorbing material was exposed to collimated light rays from the side of light absorbing layer 20 using a xenon light source by a self-aligning exposure and subsequently heated at 120° C. for development so as to be converted to a light absorbing layer 22 having apertures, thereby completing an optical diffusion film 6V.

In order to evaluate the optical quality of the optical diffusion film 6V (Example V), another optical diffusion film 6VI (Example VI) and comparative optical diffusion films C1–C4 (Comparative 1–Comparative 4) were prepared using the same process as the optical diffusion film 6V was produced. The comparative optical diffusion films C3 had no light absorbing over and layers 20 and 22, and the comparative optical diffusion films C1, C2 and C4 had no light absorbing layer 22.

For evaluations of the optical diffusion film, a visual sensory analysis was made and evaluated based on the following criteria. Granularity of the optical diffusion film was measured in the form of coarseness of a halftone image projected by a rear projector through the optical diffusion film. Contrast was measured on an image projected by a rear projector through the optical diffusion film. The results are shown in Table below.

TABLE

| | Thickness ($\mu$m) | | | $D_{20}$ Size | | | |
|---|---|---|---|---|---|---|---|
| | TBL 12 | LAL 20 | LAL 22 | TMS 14 | Granularity | Contrast | Note |
| Example V | 1 | 2 | 2 | 6 | ⊚ | ⊚ | |
| Example VI | 5 | 10 | 10 | 30 | ○ | ⊚ | |
| Comparative 1 | 1 | 2 | — | 6 | ⊚ | X | |
| Comparative 2 | 5 | 10 | — | 30 | ○ | ○ | |
| Comparative 3 | 3 | — | — | 30 | — | — | * |
| Comparative 4 | 9 | 18 | — | 55 | X | ○ | |

⊚: Superior in granularity (no feeling of coarseness) or contrast
○: No practical problem of coarseness
.: Inferior in granularity or contrast0

In the Table, marked by an asterisk indicates that some transparent microspheres dropped out.

There has been fully disclosed improved anti-theft systems. While an illustrative embodiments of the present invention has been disclosed, it is to be understood that variants and other embodiments will be apparent to those of ordinary skill in the art and it is intended that this invention be limited only by scope of the appended claims.

What is claimed is:

1. An optical diffusion film for rear projection type display devices, which comprises:

a transparent base layer, a layer of transparent microspheres disposed on said transparent base layer so that each said transparent microsphere is partly embedded in said transparent base layer; and a light absorbing layer formed over one side of said transparent base layer so as to leave each said transparent microsphere partly bare, said light absorbing layer comprising a coloring material; wherein the coloring material comprises silver behenite.

2. An optical diffusion film as described in claim 1, and further comprising a transparent substrate on which said transparent base layer is formed.

3. An optical diffusion film as described in claim 2, wherein said transparent base layer material comprises a reducing material.

4. An optical diffusion film as described in claim 3, wherein said reducing material comprises a gallic acid.

5. An optical diffusion film as described in claim 1, wherein said transparent microspheres are between approximately 3 µm and approximately 50 µm in volumetric mean size.

6. An optical diffusion film as described in claim 5, wherein said transparent microspheres are between approximately 3 µm and approximately 15 µm in volumetric mean size.

7. An optical diffusion film as described in claim 5, wherein said transparent microsphere is between approximately 10 µm and approximately 50 µm in volumetric mean size.

8. A process of producing an optical diffusion film which comprises at least a transparent base layer, a layer of transparent microspheres over said transparent base layer so that each said transparent microsphere is partly embedded in said transparent base layer; and a light absorbing layer over said transparent base layer leaving each said transparent microsphere partly bare, said optical diffusing film comprising the steps of:

forming a transparent base layer on a transparent substrate;

distributing transparent microspheres in a layer over said transparent base layer so that each said transparent microsphere is partly embedded in said transparent base layer; and forming a light absorbing layer over said transparent base layer leaving each said transparent microsphere partly bare by coating a solution layer of coloring material; and after coating the solution layer, treating said solution layer of coloring material so as thereby to convert said solution layer of coloring material into a layer of fine metal particles as said light absorbing layer;

wherein the coloring material is silver behenite.

9. A process of producing an optical diffusion film as described in claim 8, comprising the further step of heating said layer of transparent microspheres on said transparent base layer so as to partly embed each said transparent microsphere in said transparent base layer.

10. A process of producing an optical diffusion film as described in claim 8, comprising the further step of heating said layer of transparent microspheres on said transparent base layer through a heat conductive flexible sheet put over said layer of transparent microspheres.

11. A process of producing an optical diffusion film as described in claim 10, wherein said heat conductive flexible sheet comprises silicone rubber.

12. The process of producing an optical diffusion film of claim 8, wherein the transparent base layer comprises a reducing material, said reducing material reducing the coloring material to produce the fine metal particles.

13. An optical diffusion film for rear projection type display devices, which comprises:

a transparent base layer;

a layer of transparent microspheres disposed on said transparent base layer so that each said transparent microsphere is partly embedded in said transparent base layer; and a light absorbing layer formed over one side of said transparent base layer so as to leave each said transparent microsphere partly bare, said light absorbing layer comprising a coloring material, wherein the coloring material comprises an organometallic salt.

14. The optical diffusion film of claim 13, wherein the organometallic salt is selected from a group consisting of silver salts of long chain aliphatic carboxylic acid, silver salts of organic compounds having an imino group, silver salts of sulfur contained compounds, silver salts of aromatic carboxylic acid, silver salts of sulfonate, silver salts of sulfonic acid, silver salts of phosphoric acid, and silver salts of salicylicaldoxyme.

15. The optical diffusion film of claim 14, wherein the organometallic salt is a silver salt of long chain aliphatic carboxylic acid.

16. The optical diffusion film of claim 14, wherein the organometallic salt is a silver salt of organic compounds having an imino group.

17. The optical diffusion film of claim 14, wherein the organometallic salt is silver salt of sulfur contained compounds.

18. The optical diffusion film of claim 14, wherein the organometallic salt is a silver salt of aromatic carboxylic acid.

19. The optical diffusion film of claim 14, wherein the organometallic salt is a silver salt of sulfonate.

20. The optical diffusion film of claim 14, wherein the organometallic salt is a silver salt of sulfonic acid.

21. The optical diffusion film of claim 14, wherein the organometallic salt is a silver salt of phosphoric acid.

22. The optical diffusion film of claim 14, wherein the organometallic salt is a silver salt of salicylicaldoxyme.

* * * * *